US011347242B2

(12) United States Patent
Kashawlic et al.

(10) Patent No.: US 11,347,242 B2
(45) Date of Patent: May 31, 2022

(54) METHODS AND APPARATUS FOR FLIGHT CONTROL PRIORITIZATION

(71) Applicant: The Boeing Company, Chicago, IL (US)

(72) Inventors: Bryan E. Kashawlic, Chester Heights, PA (US); Brandon R. Brown, Media, PA (US)

(73) Assignee: THE BOEING COMPANY, Chicago, IL (US)

( * ) Notice: Subject to any disclaimer, the term of this patent is extended or adjusted under 35 U.S.C. 154(b) by 347 days.

(21) Appl. No.: 16/532,205

(22) Filed: Aug. 5, 2019

(65) Prior Publication Data

US 2021/0041895 A1    Feb. 11, 2021

(51) Int. Cl.
*G05D 1/10* (2006.01)
*B64C 39/02* (2006.01)
(Continued)

(52) U.S. Cl.
CPC .......... *G05D 1/101* (2013.01); *B64C 39/024* (2013.01); *B64D 31/12* (2013.01); *G05D 1/0816* (2013.01);
(Continued)

(58) Field of Classification Search
CPC combination set(s) only.
See application file for complete search history.

(56) References Cited

U.S. PATENT DOCUMENTS 9,051,055 B2 * 6/2015 Schaeffer ................ B64C 27/04
9,242,738 B2 * 1/2016 Kroo ........................ B64C 3/16
(Continued)

FOREIGN PATENT DOCUMENTS

CN    107748491 A    3/2018
CN    108170030 A    6/2018

OTHER PUBLICATIONS

O'Kane, S. (Jan. 8, 2018) "Exclusive: Volocopter's Air Taxi Takes Flight for First Time in the US" retrieved on Sep. 7, 2021 from the Verge, https://www.theverge.com/transportation/2018/1/8/16866662/ volocopter-flying-taxi-first-us-flight-intel-ces-2018 (Year: 2018).*

(Continued)

*Primary Examiner* — Maceeh Anwari
*Assistant Examiner* — Jacob Daniel Underbakke
(74) *Attorney, Agent, or Firm* — Hanley, Flight & Zimmerman, LLC

(57) ABSTRACT

Methods, apparatus, systems, and articles of manufacture are disclosed for flight control prioritization. An example apparatus includes a thrust state determiner to determine a first thrust margin between a first limit of first available power for first rotors of a rotorcraft and a first thrust state associated with the first rotors, determine a second thrust margin between a second limit of second available power for second rotors of the rotorcraft and a second thrust state associated with the second rotors, and identify the first thrust margin or the second thrust margin as a selected thrust margin based on a vertical control profile of the rotorcraft, and a command generator to determine a first vertical control command based on the selected thrust margin and a second vertical control command, the second vertical control command being executed by the rotorcraft, and control the rotorcraft based on the first vertical control command.

21 Claims, 9 Drawing Sheets

(51) Int. Cl.
  *G05D 1/08* (2006.01)
  *B64D 31/12* (2006.01)
(52) U.S. Cl.
  CPC .. *B64C 2201/027* (2013.01); *B64C 2201/042* (2013.01); *B64C 2201/108* (2013.01); *B64C 2201/141* (2013.01)

(56) References Cited

U.S. PATENT DOCUMENTS

| | | | | |
|---|---|---|---|---|
| 9,514,628 | B2* | 12/2016 | Priest | G05B 23/0272 |
| 2016/0052626 | A1* | 2/2016 | Vander Mey | B64C 27/20 |
| | | | | 244/6 |
| 2017/0233067 | A1* | 8/2017 | Eller | B64C 13/50 |
| | | | | 701/3 |
| 2017/0253332 | A1 | 9/2017 | Champagne, Jr. et al. | |
| 2018/0222580 | A1* | 8/2018 | DeLorean | B64C 39/04 |
| 2018/0354623 | A1* | 12/2018 | Bhat | B64C 27/10 |
| 2018/0370629 | A1* | 12/2018 | Finlay | B64C 29/0033 |
| 2019/0061922 | A1* | 2/2019 | Carrasco Zanini | B64C 25/10 |
| 2019/0152597 | A1* | 5/2019 | Van Niekerk | B64C 39/024 |

OTHER PUBLICATIONS

European Patent Office, "Extended European Search Report", issued in connection with EP patent application No. 20183154.2-1010, dated Dec. 22, 2020 (7 pages).

Faessler et al., "Thrust Mixing, Saturation, and Body-Rate Control for Accurate Aggressive Quadrotor Flight," IEEE Robotics and Automation Letters, vol. 2, Issue 2, first available online Dec. 15, 2016, 7 pages. Retrieved from the Internet Aug. 26, 2019, [https://www.ifi.uzh.ch/dam/jcr:5f3668fe-1d4e-4c2b-a190-8f5608f40cf3/RAL16_Faessler.pdf].

\* cited by examiner

METHODS AND APPARATUS FOR FLIGHT CONTROL PRIORITIZATION

FIELD OF THE DISCLOSURE

This disclosure relates generally to aircraft and, more particularly, to methods and apparatus for flight control prioritization.

BACKGROUND

Unmanned aerial vehicles (UAVs), commonly referred to as drones, are becoming more readily available and increasingly popular for many applications. UAVs can operate under the remote control of a human operator and/or autonomously by onboard computers. The increased interest in UAVs has resulted in an increased interest in improving flight control systems of UAVs.

SUMMARY

Methods and apparatus for flight control prioritization are disclosed.

An example apparatus disclosed herein includes a thrust state determiner to determine a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source, determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source, and identify the first thrust margin or the second thrust margin as a selected thrust margin based on a vertical control profile of the rotorcraft. The example apparatus further includes a command generator to determine a first vertical control command based on the selected thrust margin and a second vertical control command, the second vertical control command being executed by the rotorcraft and control the rotorcraft based on the first vertical control command.

An example non-transitory computer readable storage medium is disclosed. The example non-transitory computer readable storage medium comprises instructions that, when executed, cause a machine to at least determine a first thrust margin between a first limit of first available power for first rotors of a rotorcraft and a first thrust state associated with the first rotors, the first available power based on a first power source of the rotorcraft, the first thrust state based on first measurements associated with the first rotors powered by the first power source, determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source, identify the first thrust margin or the second thrust margin as a selected thrust margin based on a vertical control profile of the rotorcraft, determine a first vertical control command based on the selected thrust margin and a second vertical control command, the second vertical control command being executed by the rotorcraft, and control the rotorcraft based on the first vertical control command.

An example method disclosed herein includes determining a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source, determining a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source, identifying the first thrust margin or the second thrust margin as a selected thrust margin based on a vertical control profile of the rotorcraft, determining a first vertical control command based on the selected thrust margin and a second vertical control command, the second vertical control command being executed by the rotorcraft, and controlling the rotorcraft based on the first vertical control command.

Figures 1A, 1B:
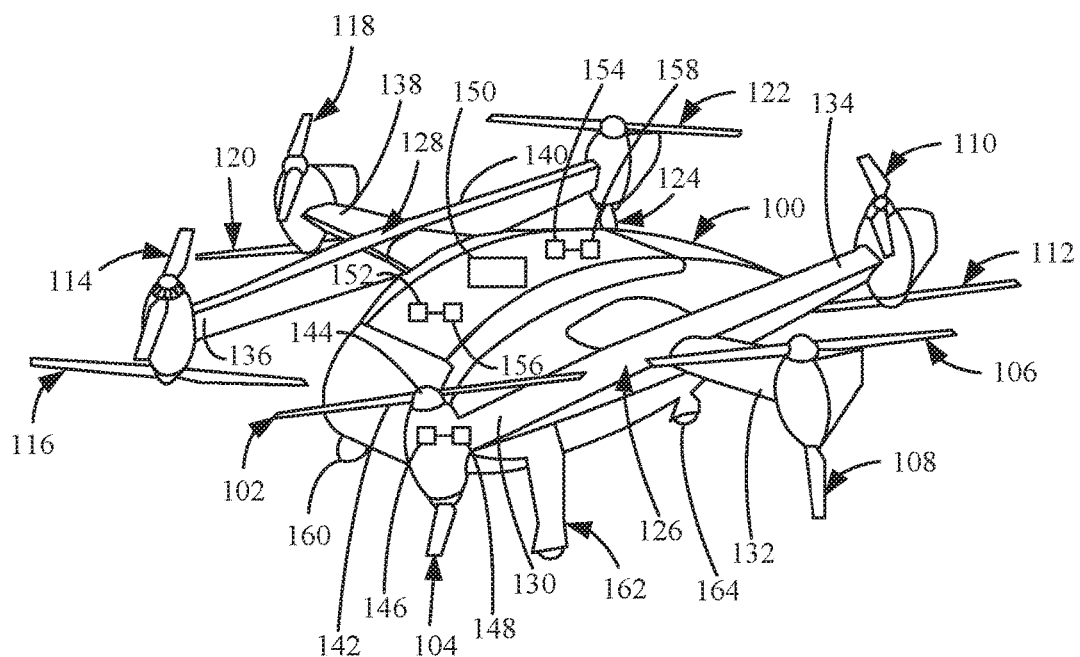
FIGS. 1A-1B depict an example aircraft.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, unmanned aerial vehicles (UAVs), or drones, have been used to fly significant distances to transport payloads (e.g., equipment, packages, supplies, etc.) or gather information. Some UAVs may be vertical take-off and landing (VTOL) aircraft that include multiple rotors (e.g., a multi-rotor VTOL aircraft, a multi-rotor VTOL UAV, etc.) to facilitate attitude and vertical control. A VTOL aircraft can correspond to an aircraft that can hover, take off, and land vertically. For example, a VTOL aircraft may execute attitude control by adjusting a rotation speed and/or an orientation of one or more rotors to control an orientation of the VTOL aircraft with respect to an inertial frame of reference. In other examples, the VTOL aircraft can execute vertical control to increase or decrease altitude by adjusting the rotation speed and/or the orientation of the one or more rotors.

During an emergency condition, a VTOL aircraft may need to prioritize attitude control over vertical control. For example, an electric VTOL aircraft may be operating on reduced power (e.g., one or more batteries are running low or in a reduced power state) and may not be able to provide a maximum power input (e.g., compared to when the one or more batteries are fully or substantially fully charged) to motors operatively coupled to the rotors to execute both maximum attitude control and maximum vertical control. In such examples, the electric VTOL aircraft may need to prioritize attitude control to ensure that the electric VTOL aircraft is in an orientation relative to a ground surface to facilitate landing on the ground surface using landing gear of the electric VTOL aircraft. Alternatively, by prioritizing vertical control over attitude control, the electric VTOL aircraft may not touch down using the landing gear causing damage to the electric VTOL aircraft.

Conventional rotary-wing aircraft (e.g., a helicopter or other aircraft with powered rotors) may not need to enforce a prioritization of attitude control over vertical control because rotary-wing aircraft typically use rotor cyclic pitch for attitude control, which does not significantly impact an amount of thrust a rotor of the rotary-wing aircraft is capable of generating. Conversely, a multi-rotor VTOL UAV controls individual rotor thrust to control both attitude and vertical states. For example, a multi-rotor VTOL UAV may use differential rotor thrust for attitude control and symmetric rotor thrust for vertical control. Thus, thrust limiting at any actuator, motor, etc., of the multi-rotor VTOL UAV can impact the attitude and vertical control response of the multi-rotor VTOL UAV.

Examples disclosed herein include methods and apparatus for flight control prioritization for multi-rotor aircraft. In some disclosed examples, a multi-rotor aircraft, such as an electric multi-rotor VTOL UAV, includes a flight control system that integrates attitude control and electrical power systems of the multi-rotor aircraft to generate an upper limit to an allowable vertical control. Advantageously, by generating the upper limit, the flight control system ensures sufficient attitude control capability of the multi-rotor aircraft to avoid a potential crash or other undesirable flight event while maximizing the allowable vertical control.

In some disclosed examples, the flight control system includes a vertical limit controller to obtain measurements associated with one or more electrical or power distribution buses of the multi-rotor aircraft. The vertical limit controller can determine a thrust state (e.g., a rotor thrust state) associated with a rotor operatively coupled to a motor under current operating conditions (e.g., instantaneous or substantially instantaneous operating conditions). In some disclosed examples, the thrust state corresponds to and/or is otherwise based on a current allocation of power to the rotor motor. For example, the thrust state of the rotor can correspond to a current or instantaneous amount of electrical current, voltage, etc., being consumed by and/or otherwise applied to the motor controlling a rotation of the rotor. In such examples, the rotor can have a thrust state of 20 V, 40 V, etc.

In some disclosed examples, the vertical limit controller determines a thrust margin (e.g., a rotor thrust margin, a thrust state margin, a rotor thrust state margin, etc.) associated with a rotor of a multi-rotor aircraft under current operating conditions. For example, a thrust state margin can correspond to a difference between (1) a maximum (possible) allocation of power to a rotor motor and (2) a current allocation of power to the rotor motor.

In some disclosed examples, the vertical limit controller determines a power bus thrust margin associated with one or more rotors having a corresponding motor powered by a power bus of interest. For example, the power bus may deliver power to a first motor operatively coupled to a first rotor and a second motor operatively coupled to a second rotor. The vertical limit controller can determine a first thrust state for the first rotor based on a first voltage being applied to the first motor and a second thrust state for the second rotor based on a second voltage being applied to the second motor. The vertical limit controller can determine a power bus thrust state by determining a maximum value, a minimum value, an average value, etc., of the first thrust state and the second thrust state. The vertical limit controller can determine the power bus thrust margin by determining a difference between the power bus thrust state and a voltage associated with one or more power sources delivering power to the power bus.

In some disclosed examples, a thrust state margin of a rotor is inversely proportional to a thrust state of the rotor. For example, a thrust state margin of a rotor can increase as a thrust state of the rotor decreases. In some examples, a minimum thrust state margin of a rotor can correspond to a maximum thrust state of the rotor because a corresponding motor is consuming a maximum quantity of allocated power to the motor to satisfy, reach, and/or otherwise maintain a commanded speed of the rotor. In such examples, a rotor having a maximum thrust state does not respond to command changes to increase thrust because the corresponding thrust state margin is approximately zero. Accordingly, a rotor having a maximum thrust state can cause degradation in attitude control associated with the rotor.

In some disclosed examples, the vertical limit controller down selects from a plurality of thrust state margins to an identified thrust state margin based on a minimum, an average, a maximum, etc., value of the plurality of thrust state margins based on a vertical control profile of the multi-rotor aircraft. In such disclosed examples, the vertical control profile can correspond to a level of thrust that the multi-rotor aircraft can satisfy, reach, and/or otherwise maintain based on power allocations to the one or more rotors. For example, the level of thrust can correspond to a maximum level of thrust achievable and/or otherwise obtainable by rotors of the multi-rotor aircraft.

In some disclosed examples, the maximum level of thrust can be based on whether the thrust states associated with the rotors are minimized, maximized, averaged, etc., to satisfy a desired, intended, or thrust state margin of interest. For example, a first level of thrust for a rotor can correspond to a first thrust margin (e.g., a conservative thrust state margin), a second level of thrust for the rotor can correspond to a second thrust margin less than the first thrust margin (e.g., an average thrust state margin), and a third level of thrust for the rotor can correspond to a third thrust margin less than the second thrust margin (e.g., not a conservative thrust state margin, an aggressive thrust state margin, etc.). In some disclosed examples, the vertical limit controller determines a vertical control command for the multi-rotor aircraft based on the down-selected thrust state margin and a current vertical control command to prioritize attitude control over vertical control.

FIGS. 1A-1B depict an example aircraft 100. FIG. 1A is a top isometric view of the aircraft 100 and FIG. 1B is a bottom isometric view of the aircraft 100. In FIGS. 1A-1B, the aircraft 100 is a rotorcraft, such as a multi-rotor UAV. For example, the aircraft 100 can be a multi-rotor VTOL UAV. In such examples, the aircraft 100 can be an electric-powered multi-rotor VTOL UAV, a chemical-fuel powered multi-rotor VTOL UAV, etc., and/or a combination thereof. Alternatively, the aircraft 100 may be operator controlled and/or otherwise have one or more users (e.g., pilots) onboard the aircraft 100. Alternatively, the aircraft 100 may be any other type of multi-rotor aircraft.

The aircraft 100 includes example rotor assemblies 102, 104, 106, 108, 110, 112, 114, 116, 118, 120, 122, 124 to control and/or otherwise facilitate flight of the aircraft 100. The aircraft 100 includes a first example rotor assembly 102, a second example rotor assembly 104, a third example rotor assembly 106, a fourth example rotor assembly 108, a fifth example rotor assembly 110, and a sixth example rotor assembly 112 on a first side of the aircraft 100. The aircraft 100 includes a seventh example rotor assembly 114, an eighth example rotor assembly 116, a ninth example rotor assembly 118, a tenth example rotor assembly 120, an eleventh example rotor assembly 122, and a twelfth example rotor assembly 124 on a second side of the aircraft 100 opposite the first side. Alternatively, the aircraft 100 may include fewer or more rotor assemblies than depicted in FIGS. 1A-1B.

In the illustrated example of FIG. 1A, the aircraft 100 includes a first example rotor support frame 126 on the first side of the aircraft 100 and a second example rotor support frame 128 on the second side of the aircraft 100. The first and second rotor assemblies 102, 104 are coupled to the aircraft 100 via a first example leg 130 of the first rotor support frame 126. The third and fourth rotor assemblies 106, 108 are coupled to the aircraft 100 via a second example leg 132 of the first rotor support frame 126. The fifth and sixth rotor assemblies 110, 112 are coupled to the aircraft 100 via a third example leg 134 of the first rotor support frame 126. The seventh and eighth rotor assemblies 114, 116 are coupled to the aircraft 100 via a first example leg 136 of the second rotor support frame 128. The ninth and tenth rotor assemblies 118, 120 are coupled to the aircraft 100 via a second example leg 138 of the second rotor support frame 128. The eleventh and twelfth rotor assemblies 122, 124 are coupled to the aircraft 100 via a third example leg 140 of the second rotor support frame 128.

In the illustrated example of FIG. 1A, each of the rotor assemblies 102-124 include two example propellers 142, an example rotor 144, an example motor 146, and an example sensor 148. Alternatively, one or more of the rotor assemblies 102-124 may include fewer or more propellers 142 than depicted in FIG. 1A. Alternatively, one or more of the rotor assemblies 102-124 may include more than one rotor 144, motor 146, and/or sensor 148 than depicted in FIG. 1A.

The rotor assemblies 102-124 of the illustrated example of FIG. 1A are operative to facilitate attitude control and/or vertical control of the aircraft 100. For example, a rotation speed of the rotor 144 may be increased to increase altitude, decreased to decrease altitude, etc. In other examples, a first set of one or more of the rotor assemblies 102-124 may increase a rotation speed of a corresponding rotor 144 while a different set of one or more of the rotor assemblies 102-124 may decrease a rotation speed of a corresponding rotor 144 to affect attitude control of the aircraft 100.

The rotor assemblies 102-124 of the illustrated example of FIG. 1A include the motor 146 to enable, rotate, and/or otherwise facilitate operation of the propellers 142 and the rotor 144. In FIG. 1A, the motor 146 is an electric motor. Alternatively, the motor 146 may be replaced with or operate in connection with an engine (e.g., an internal combustible engine). For example, the motor 146 may be powered by one or more alternators associated with an engine.

In the illustrated example of FIG. 1A, the aircraft 100 includes an example controller (e.g., a flight controller, a flight control computing device, etc.) 150 to control and/or otherwise facilitate operation (e.g., flight operation) of the aircraft 100. The controller 150 controls a pitch, roll, and/or yaw of the aircraft 100 via differential rotor thrust (e.g., a differential rotor thrust flight control method, a flight control method based on differential rotor thrust vectors, etc.). In other examples, the controller 150 can control the pitch, roll, and/or yaw of the aircraft 100 via any other flight control method or schema. For example, the controller 150 may direct, instruct, and/or otherwise invoke the motor 146 of one or more of the rotor assemblies 102-124 to adjust a rotation speed of a corresponding rotor 144. In such examples, the controller 150 can adjust (e.g., individually adjust) a quantity of power that is delivered to and/or consumed by the motor 146 and/or, more generally, the rotor assemblies 102-124. Alternatively, the aircraft 100 may include more than one controller 150 to facilitate operation of the aircraft 100.

The controller 150 of FIG. 1A obtains measurements (e.g., sensor measurements) associated with the rotor assemblies 102-124 from the sensor 148. For example, the controller 150 may be coupled (e.g., communicatively coupled, electrically coupled, mechanically coupled, etc.) to the sensor 148 of one or more of the rotor assemblies 102-124. In FIG. 1A, the sensor 148 is a voltage sensor. For example, the controller 150 may obtain a voltage being supplied to the motor 146. Alternatively, the sensor 148 may be a current sensor, a speed sensor, a temperature sensor, etc. For example, the controller 150 may obtain a current being supplied to the motor 146, a rotation speed (e.g., revolutions per minute (RPM)) of the motor 146, a temperature of the motor 146, etc. Alternatively, the controller 150 may obtain measurements from the motor 146. For example, the controller 150 may communicate with the motor 146 via an industrial communication protocol bus (e.g., controller area network (CAN) protocol, Aeronautical Radio, Incorporated (ARINC) based protocol (e.g., ARINC 429, ARINC 629, etc.)) to obtain parameters associated with the motor 146, such as a motor speed, a current and/or a voltage supply to the motor 146, a temperature, etc.

The aircraft 100 of FIG. 1A includes example power sources 152, 154 including a first example power source 152 and a second example power source 154. For example, the first power source 152 may correspond to a first power bus of the aircraft 100 and the second power source 154 may correspond to a second power bus of the aircraft 100. In other examples, the aircraft 100 can include fewer or more power buses, power sources, etc., than the power sources 152, 154 depicted in FIG. 1A. In FIG. 1A, the first power source 152 can provide power to the first through sixth rotor assemblies 102-112 and the second power source 154 can provide power to the seventh through twelfth rotor assemblies 114-124. Alternatively, the first and second power sources 152, 154 may provide power to any other combination of rotor assemblies 102-124. The power sources 152, 154 of FIG. 1A are batteries and each of the power sources 152, 154 may include one or more batteries (e.g., lithium-ion batteries, lithium-polymer batteries (e.g., Nickel Metal Hydride (NiMH) batteries, Nickel Cadmium (NiCd) batteries, etc.), etc.). Alternatively, one or both power sources 152, 154 may be a different type of energy storage device.

The controller 150 of FIG. 1A obtains measurements (e.g., sensor measurements) associated with the first power source 152 via a first example power source sensor 156 and the second power source 154 via a second example power source sensor 158. In some examples, the power source sensors 156, 158 are voltage sensors. For example, the controller 150 may determine a first voltage of the first power source 152 based on a first measurement (e.g., a first voltage rail measurement, a first power bus voltage measurement, etc.) from the first power source sensor 156. In other examples, the controller 150 can determine a second voltage of the second power source 154 based on a second measurement (e.g., a second voltage rail measurement, a second power bus voltage measurement, etc.) from the second power source sensor 158. Additionally or alternatively, the first power source sensor 156 and/or the second power source sensor 158 may be a current sensor, a temperature sensor, etc., and/or a combination thereof. For example, the power source sensors 156, 158 may obtain a temperature measurement indicative of a temperature (e.g., a core temperature, a surface temperature, etc.) of the power sources 152, 154.

The aircraft 100 of FIGS. 1A-1B includes example landing gear 160, 162, 164 including first example landing gear 160, second example landing gear 162, and third example landing gear 164. In operation, the controller 150 generates and transmits commands to the rotor assemblies 102-124 to prioritize attitude control over vertical control to ensure that the aircraft 100 lands on the landing gear 160, 162, 164 during an emergency condition, a condition associated with one or both power sources 152, 154 having a low voltage, etc.

Figure 2:
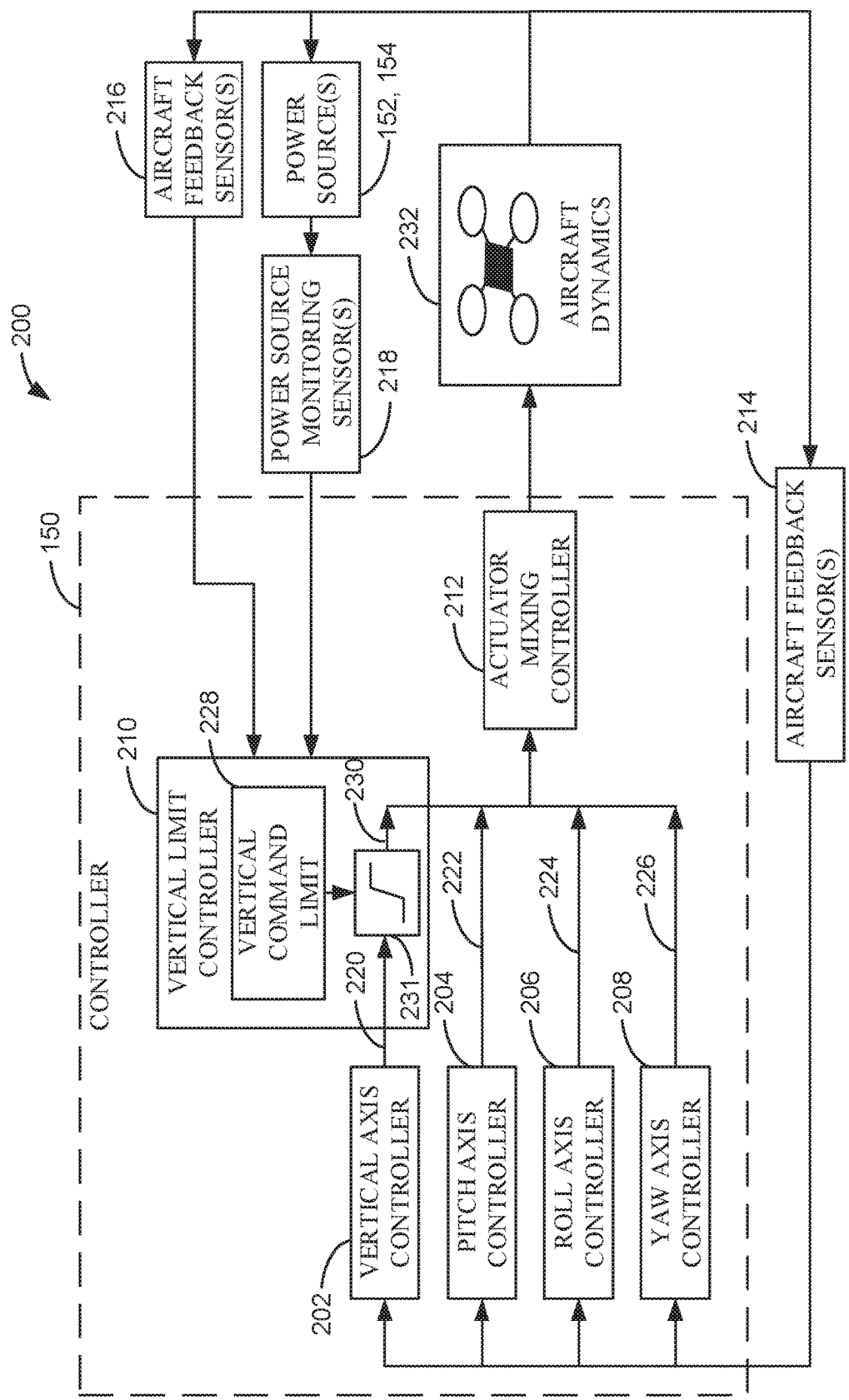
FIG. 2 depicts an example flight control system of the example aircraft of FIGS. 1A-1B including an example controller including an example vertical limit controller.

FIG. 2 depicts an example flight control system 200 of the aircraft 100 of FIGS. 1A-1B. The flight control system 200 of FIG. 2 includes the controller 150 of FIG. 1A, which includes an example vertical axis controller 202, an example pitch axis controller 204, an example roll axis controller 206, an example yaw axis controller 208, an example vertical limit controller 210, and an example actuator mixing controller 212. The flight control system 200 of FIG. 2 includes first example aircraft feedback sensor(s) 214, second example aircraft feedback sensor(s) 216, example power source monitoring sensor(s) 218, and the power sources 152, 154 of FIG. 1A.

In the illustrated example of FIG. 2, the first aircraft feedback sensor(s) 214 can correspond to one or more speed sensors associated with the rotor 144, the motor 146, and/or, more generally, the aircraft 100 of FIG. 1A. For example, the first aircraft feedback sensor(s) 214 can correspond to one or more sensors, such as the sensor 148 of FIG. 1A. In other examples, the first aircraft feedback sensor(s) 214 can correspond to an acceleration sensor (e.g., an accelerometer), an angle of attack sensor, an angular rate sensor (e.g., a gyro sensor), etc. In FIG. 2, the second aircraft feedback sensor(s) 216 can correspond to one or more sensors that can measure a current, a voltage, etc., associated with the rotor 144, the motor 146, and/or more generally, the aircraft 100 of FIG. 1A. For example, the second aircraft feedback sensor(s) 216 can correspond to one or more sensors, such as the sensor 148 of FIG. 1A. Alternatively, the second aircraft feedback sensor(s) 216 can correspond to an acceleration sensor (e.g., an accelerometer), an angle of attack sensor, an angular rate sensor (e.g., a gyro sensor), etc. In FIG. 2, the power source monitoring sensor(s) 218 can correspond to one or more sensors that can measure a current, a voltage, etc., associated with the power sources 152, 154 of FIG. 1A. For example, the power source monitoring sensor(s) 218 can correspond to the power source sensors 156, 158 of FIG. 1A.

In the illustrated example of FIG. 2, the controller 150 and/or, more generally, the flight control system 200 includes the vertical axis controller 202 to determine first example actuator commands 220 corresponding to at least one of an RPM value (e.g., an RPM setpoint value, a commanded RPM value, a desired RPM value, etc.) of one or more of the rotors 144 of FIG. 1A, an RPM value of one or more of the motors 146 of FIG. 1A, etc., and/or a combination thereof to affect an altitude of the aircraft 100. For example, the vertical axis controller 202 may determine the first actuator commands 220 to affect an operation of one or more of the rotor assemblies 102-124 of FIGS. 1A-1B based on measurement(s) from the first aircraft feedback sensor(s) 214. For example, the vertical axis controller 202 can determine an altitude error based on the first aircraft feedback sensor(s) 214 and determine the first actuator commands (e.g., rotor speed commands, rotor angle or tilt commands, etc.) 220 to achieve a desired altitude (e.g., reduce and/or otherwise eliminate the altitude error). In such examples, the vertical axis controller 202 can determine the first actuator commands 220 based on a current or instantaneous rotation speed associated with one or more of the rotor assemblies 102-124.

In the illustrated example of FIG. 2, the controller 150 and/or, more generally, the flight control system 200 includes the pitch axis controller 204 to determine second example actuator commands 222 corresponding to at least one of an RPM value of one or more of the rotors 144 of FIG. 1A, an RPM value of one or more of the motors 146 of FIG. 1A, etc., and/or a combination thereof to affect a pitch of the aircraft 100. For example, the pitch axis controller 204 may determine the second actuator commands 222 to adjust and/or otherwise affect an operation of one or more of the rotor assemblies 102-124 of FIGS. 1A-1B based on measurement(s) from the first aircraft feedback sensor(s) 214. For example, the pitch axis controller 204 can determine a pitch error (e.g., an incorrect forward or rearward position) based on the first aircraft feedback sensor(s) 214 and determine the second actuator commands (e.g., rotor speed commands, rotor angle or tilt commands, etc.) 222 to achieve a desired pitch (e.g., reduce and/or otherwise eliminate the pitch error). In such examples, the pitch axis controller 204 can determine the second actuator commands 222 based on a current rotation speed associated with one or more of the rotor assemblies 102-124.

In the illustrated example of FIG. 2, the controller 150 and/or, more generally, the flight control system 200 includes the roll axis controller 206 to determine third example actuator commands 224 corresponding to at least one of an RPM value of one or more of the rotors 144 of FIG. 1A, an RPM value of one or more of the motors 146 of FIG. 1A, etc., and/or a combination thereof to adjust and/or otherwise affect a roll of the aircraft 100. For example, the roll axis controller 206 may determine the third actuator commands 224 to instruct an operation of one or more of the rotor assemblies 102-124 of FIGS. 1A-1B based on measurement(s) from the first aircraft feedback sensor(s) 214. For example, the vertical axis controller 202 can determine a roll error (e.g., an incorrect sideward position) based on the first aircraft feedback sensor(s) 214 and determine the third actuator commands (e.g., rotor speed commands, rotor angle or tilt commands, etc.) 224 to achieve a desired roll (e.g., reduce and/or otherwise eliminate the roll error). In such examples, the roll axis controller 206 can determine the third actuator commands 224 based on a current rotation speed associated with one or more of the rotor assemblies 102-124.

In the illustrated example of FIG. 2, the controller 150 and/or, more generally, the flight control system 200 includes the yaw axis controller 208 to determine fourth example actuator commands 226 corresponding to at least one of an RPM value of one or more of the rotors 144 of FIG. 1A, an RPM value of one or more of the motors 146 of FIG. 1A, etc., and/or a combination thereof to adjust and/or otherwise affect a yaw of the aircraft 100. For example, the yaw axis controller 208 may determine the fourth actuator commands 226 to direct an operation of one or more of the rotor assemblies 102-124 of FIGS. 1A-1B based on measurement(s) from the first aircraft feedback sensor(s) 214. For example, the yaw axis controller 208 can determine a yaw error (e.g., an incorrect heading) based on the first aircraft feedback sensor(s) 214 and determine the fourth actuator commands (e.g., rotor speed commands, rotor angle or tilt commands, etc.) 226 to achieve a desired yaw (e.g., reduce and/or otherwise eliminate the yaw error). In such examples, the yaw axis controller 208 can determine the fourth actuator commands 226 based on a current rotation speed associated with one or more of the rotor assemblies 102-124.

In the illustrated example of FIG. 2, the controller 150 and/or, more generally, the flight control system 200 includes the vertical limit controller 210 to generate an example vertical command limit 228. The vertical command limit 228 can correspond to an electrical limit value associated with operation of the rotor 144. For example, the vertical command limit 228 can correspond to an over-voltage limit value, an over-current limit value, etc., above which the first actuator commands 220 generated by the vertical axis controller 202 may not exceed.

In some examples, the vertical limit controller 210 generates example vertical commands 230 based on at least one of the first actuator commands 220 or the vertical command limit 228. In FIG. 2, the vertical limit controller 210 generates the vertical commands 230 by executing an example vertical command limit function 231. For example, the vertical limit controller 210 can generate the vertical commands 230 to correspond to the first actuator commands 220 when the first actuator commands 220 do not invoke the vertical command limit 228. For example, if a first voltage associated with the first actuator commands 220 are less than or equal to a second voltage associated with the vertical command limit 228, the vertical limit controller 210 can allow passage or transmission of the first actuator commands 220 to the actuator mixing controller 212.

In some examples, the vertical limit controller 210 generates the vertical commands 230 based on the vertical command limit 228. For example, the vertical limit controller 210 can generate the vertical commands 230 to correspond to the vertical command limit 228 when the first actuator commands 220 invoke the vertical command limit 228. For example, if a first voltage associated with the first actuator commands 220 are greater than a second voltage associated with the vertical command limit 228, the vertical limit controller 210 can dampen, reduce, and/or otherwise limit the first actuator commands 220 to the vertical command limit 228. In such examples, the vertical limit controller 210 can transmit the vertical commands 230 to the actuator mixing controller 212, where the vertical commands 230 are limited to a value associated with the vertical command limit 228.

In the illustrated example of FIG. 2, the controller 150 and/or, more generally, the flight control system 200 includes the actuator mixing controller 212 to synthesize at least one of the vertical commands 230 (e.g., the first actuator commands 220, the first actuator commands 220 limited to the vertical command limit 228, etc.), the second actuator commands 222, the third actuator commands 224, or the fourth actuator commands 226 into example aircraft dynamics 232. For example, the actuator mixing controller 212 may generate and transmit commands to the rotor assemblies 102-124 based on a blending, a mixing, and/or another fusion of one or more of the vertical commands 230, the second actuator commands 222, the third actuator commands 224, and/or the fourth actuator commands 226. For example, the aircraft dynamics 232 may correspond to movement of the aircraft 100, such as moving from a first location to a second location, a first altitude to a second altitude, a first orientation to a second orientation, etc., and/or a combination thereof.

While an example manner of implementing the controller 150 of FIG. 1A is illustrated in FIG. 2, one or more of the elements, processes, and/or devices illustrated in FIG. 2 may be combined, divided, re-arranged, omitted, eliminated, and/or implemented in any other way. Further, the example vertical axis controller 202, the example pitch axis controller 204, the example roll axis controller 206, the example yaw axis controller 208, the example vertical limit controller 210, the example actuator mixing controller 212, and/or, more generally, the example controller 150 of FIG. 1A may be implemented by hardware, software, firmware, and/or any combination of hardware, software, and/or firmware. Thus, for example, any of the example vertical axis controller 202, the example pitch axis controller 204, the example roll axis controller 206, the example yaw axis controller 208, the example vertical limit controller 210, the example actuator mixing controller 212, and/or, more generally, the example controller 150 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example vertical axis controller 202, the example pitch axis controller 204, the example roll axis controller 206, the example yaw axis controller 208, the example vertical limit controller 210, and/or the example actuator mixing controller 212 is/are hereby expressly defined to include a non-transitory computer readable storage device or storage disk such as a memory, a digital versatile disk (DVD), a compact disk (CD), a Blu-ray disk, etc., including the software and/or firmware. Further still, the example controller 150 of FIG. 1A may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
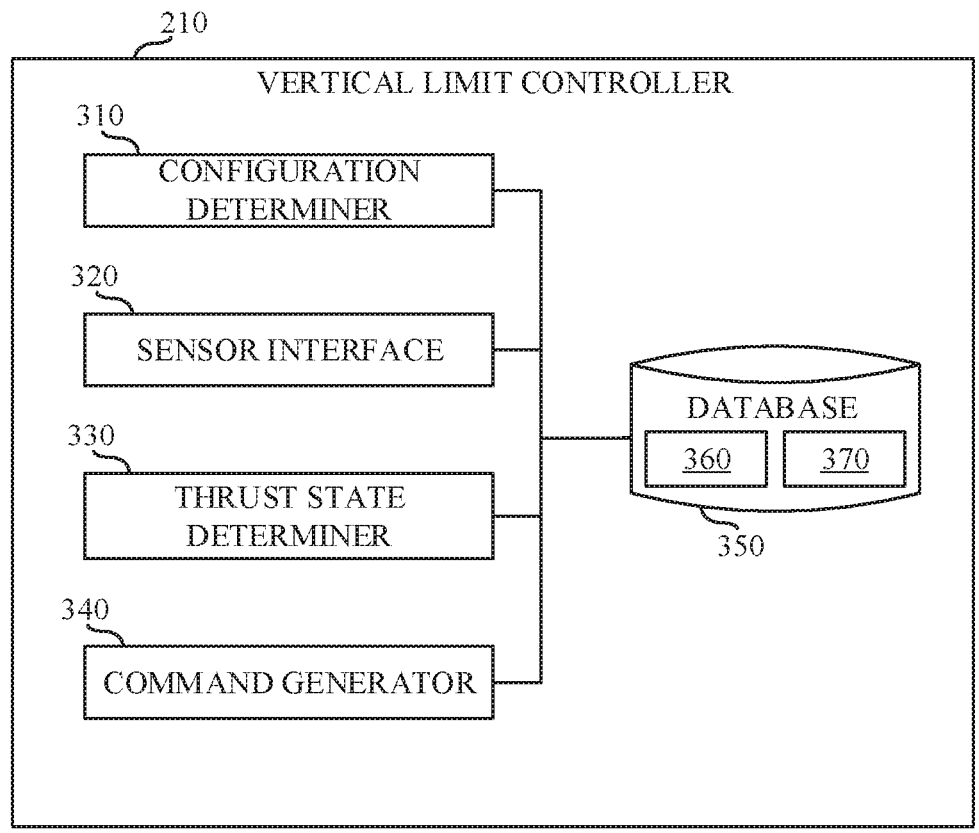
FIG. 3 depicts an example implementation of the example vertical limit controller of the example controller of FIG. 2.

FIG. 3 depicts an example implementation of the vertical limit controller 210 of the example flight control system of FIG. 2. In some examples, the vertical limit controller 210 determines the vertical command limit 228 of FIG. 2 based on at least one of a power distribution configuration, a vertical control profile, or measurement(s) associated with the rotor assemblies 102-124 of the aircraft 100 of FIGS. 1A-1B. In the illustrated example of FIG. 3, the vertical limit controller 210 includes an example configuration determiner 310, an example sensor interface 320, an example thrust state determiner 330, an example command generator 340, and an example database 350. Further depicted in the database 350 of FIG. 3 are an example power distribution configuration 360 and example vertical control profile(s) 370.

In the illustrated example of FIG. 3, the vertical limit controller 210 includes the configuration determiner 310 to determine a configuration associated with the aircraft 100 of FIGS. 1A-1B, such as the power distribution configuration 360. For example, the configuration determiner 310 may determine the power distribution configuration 360 of the aircraft 100 by querying the database 350. In such examples, the configuration determiner 310 can determine that the power distribution configuration 360 of the aircraft 100 includes one or more electrical or power buses (e.g., electrical distribution buses, power distribution buses, etc.). For example, the configuration determiner 310 may determine that the aircraft 100 has a power distribution configuration or topology that corresponds to and/or otherwise includes having one or more power buses.

In some examples, the configuration determiner 310 identifies and/or otherwise determines that a power distribution bus of the aircraft 100 provides and/or otherwise delivers power to one or more components, such as the rotor 144, the motor 146, the sensor 148, and/or, more generally the rotor assemblies 102-124 of FIG. 1A based on the power distribution configuration 360. For example, the configuration determiner 310 may determine that a first power distribution bus of the aircraft 100 delivers power to the motors 146 of the first, second, third, fourth, ninth, and tenth rotor assemblies 102, 104, 106, 108, 110, 118, 120 of FIGS. 1A-1B based on the power distribution configuration 360. In other examples, the configuration determiner 310 can determine that a second power distribution bus of the aircraft 100 delivers power to the motors 146 of the fifth, sixth, seventh, eighth, eleventh, and twelfth rotor assemblies 112, 114, 116, 122, 124 of FIGS. 1A-1B based on the power distribution configuration 360.

In some examples, the configuration determiner 310 determines one of the vertical control profile(s) 370 being used or to be used by the aircraft 100. For example, the configuration determiner 310 may determine that the aircraft 100 is using a first one of the vertical control profile(s) 370. In such examples, the configuration determiner 310 can determine that the first one of the vertical control profile(s) 370 corresponds to a first level of thrust that the aircraft 100 can satisfy, reach, and/or otherwise maintain based on power allocations to the one or more rotors 144 of FIG. 1A. In other examples, the configuration determiner 310 can determine that a second one of the vertical control profiles 370 corresponds to a second level of thrust different from the first level of thrust. For example, the configuration determiner 310 may determine that the first one of the vertical control profiles 370 corresponds to a conservative vertical control profile (e.g., a conservative power profile) and the second one of the vertical control profiles 370 corresponds to an aggressive vertical control profile (e.g., a non-conservative power profile, an aggressive power profile, etc.). In such examples, the conservative power profile can correspond to the aircraft 100 having a higher thrust margin compared to the aggressive power profile because the conservative power profile may enable less power to be delivered to the rotor assemblies 102-124 compared to the aggressive power profile that may enable a maximum allowed quantity of power to be delivered to the rotor assemblies 102-124.

In the illustrated example of FIG. 3, the vertical limit controller 210 includes the sensor interface 320 to collect and/or otherwise obtain measurements associated with the aircraft 100. In some examples, the sensor interface 320 obtains measurements associated with the rotor assemblies 102-124 of FIGS. 1A-1B. For example, the sensor interface 320 may obtain an electrical current and/or voltage measurement of the motor 146, a speed measurement of the rotor 144, etc., from the sensor 148 of FIG. 1A. In some examples, the sensor interface 320 obtains measurements associated with a power bus of interest. For example, the sensor interface 320 may obtain a voltage measurement of the power sources 152, 154 of FIG. 1A from the power source sensors 156, 158. Additionally or alternatively, the sensor interface 320 may obtain a measurement from a sensor monitoring any other component and/or characteristic associated with the aircraft 100. For example, the sensor interface 320 may obtain a temperature associated with the power sources 152, 154 from the power source sensors 156, 158.

In the illustrated example of FIG. 3, the vertical limit controller 210 includes the thrust state determiner 330 to determine a thrust state (e.g., a rotor thrust state) associated with one or more of the rotor assemblies 102-124. In some examples, the thrust state determiner 330 determines a thrust state associated with a rotor assembly based on measurements obtained from a sensor monitoring and/or otherwise associated with the rotor assembly. For example, the thrust state determiner 330 may determine a thrust state of the rotor 144 based on a measurement of the sensor 148. In such examples, the thrust state determiner 330 can determine the thrust state of the rotor 144 by determining a voltage being applied to the motor 146, where the voltage is sensed and/or otherwise measured by the sensor 148.

In some examples, the thrust state determiner 330 determines a thrust state (e.g., a power bus thrust state) for one or more of the rotor assemblies 102-124 powered by a power bus of interest, where the determination can be based on the vertical control profile 370 of the aircraft 100. For example, a power bus of interest may include the first through fourth rotor assemblies 102, 104, 106, 108 of FIGS. 1A-1B. The thrust state determiner 330 may determine a first thrust state of the first rotor assembly 102 by determining a first voltage being applied to the motor 146 of the first rotor assembly 102, a second thrust state of the second rotor assembly 104 by determining a second voltage being applied to the motor 146 of the second rotor assembly 104, etc.

In some examples, the thrust state determiner 330 determines that the vertical control profile 370 of the aircraft 100 is a first vertical control profile that corresponds to a first level of thrust allocated to the rotor assemblies 102-124 indicative of the aircraft 100 having minimum thrust state margins (e.g., an aggressive vertical control profile). For example, the first level of thrust can be a level of thrust allocated to vertical control of the aircraft 100. Based on the first vertical control profile, the thrust state determiner 330 may determine a power bus thrust state by determining a minimum value of the first thrust state, the second thrust state, etc., associated with the power bus of interest. In such examples, the values of the thrust state margins can be inversely proportional to the values of the underlying thrust states.

In other examples, the thrust state determiner 330 can determine that the vertical control profile 370 of the aircraft 100 is a second vertical control profile that corresponds to a second level of thrust allocated to the rotor assemblies 102-124 indicative of average thrust state margins (e.g., an average vertical control profile, a vertical control profile between a conservative and aggressive vertical control profile, etc.). For example, the second level of thrust can be less than the first level of thrust associated with the first vertical control profile. Based on the second vertical control profile, the thrust state determiner 330 may determine a power bus thrust state by determining an average value of the first thrust state, the second thrust state, etc., associated with the power bus of interest.

In yet other examples, the thrust state determiner 330 can determine that the vertical control profile 370 of the aircraft 100 is a third vertical control profile that corresponds to a third level of thrust allocated to the rotor assemblies 102-124 indicative of maximum thrust state margins (e.g., a conservative vertical control profile). For example, the third level of thrust can be less than the first and the second levels of thrust. Based on the third vertical control profile, the thrust state determiner 330 may determine a power bus thrust state by determining a maximum value of the first thrust state, the second thrust state, etc., associated with the power bus of interest.

In some examples, the thrust state determiner 330 determines a thrust state margin based on one or more thrust states associated with one or more of the rotor assemblies 102-124. For example, the thrust state determiner 330 may determine a thrust state margin based on a difference between a (1) power bus thrust state and (2) a difference between a reference or reserve voltage and a rail voltage (e.g., a voltage associated with one or more of the power sources 152, 154 of FIG. 1A). In such examples, the thrust state margin can correspond to a difference between an instantaneous thrust state (e.g., the power bus thrust state) and a maximum allocation of power that can be delivered to a power bus (e.g., the difference between the reference or the reserve voltage and the rail voltage).

In the illustrated example of FIG. 3, the vertical limit controller 210 includes the command generator 340 to generate the vertical command limit 228 of FIG. 2 and/or, more generally, the vertical command 230 of FIG. 2. For example, the command generator 340 may control (e.g., vertically control) the aircraft 100 by generating the vertical command 230. In some examples, the command generator 340 determines the vertical command limit 228 by applying one or more transfer functions to a thrust margin (e.g., a power bus thrust margin) of interest. In some examples, the command generator 340 generates a command (e.g., a vertical command) to be transmitted to the actuator mixing controller 212 of FIG. 2. For example, the command generator 340 may generate the command by determining a minimum, an average, etc., value of the vertical command limit 228 and the first actuator commands 220 generated by the vertical axis controller 202 of FIG. 2. In such examples, the command generator 340 can generate the command to correspond to a minimum value of either the vertical command limit 228 or the first actuator commands 220, which corresponds to an unlimited total vertical control limit. Advantageously, by generating the command based on the minimum value, the actuator mixing controller 212 can generate one or more commands to allow the aircraft 100 to prioritize attitude control by reducing vertical control if necessary.

In the illustrated example of FIG. 3, the vertical limit controller 210 includes the database 350 to record data (e.g., the power distribution configuration 360, one or more of the vertical control profiles 370, one or more measurements from one or more sensors of the aircraft 100, etc.). The database 350 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 350 may additionally or alternatively be implemented by one or more double data rate (DDR) memories, such as DDR, DDR2, DDR3, DDR4, mobile DDR (mDDR), etc. The database 350 may additionally or alternatively be implemented by one or more mass storage devices such as hard disk drive(s) (HDD(s)), CD drive(s), DVD drive(s), solid-state disk (SSD) drive(s), etc. While in the illustrated example the database 350 is illustrated as a single database, the database 350 may be implemented by any number and/or type(s) of databases. Furthermore, the data stored in the database 350 may be in any data format such as, for example, binary data, comma delimited data, tab delimited data, structured query language (SQL) structures, etc.

While an example manner of implementing the vertical limit controller 210 of FIG. 2 is illustrated in FIG. 3, one or more of the elements, processes, and/or devices illustrated in FIG. 3 may be combined, divided, re-arranged, omitted, eliminated, and/or implemented in any other way. Further, the example configuration determiner 310, the example sensor interface 320, the example thrust state determiner 330, the example command generator 340, and/or, more generally, the example vertical limit controller 210 of FIG. 2 may be implemented by hardware, software, firmware, and/or any combination of hardware, software, and/or firmware. Thus, for example, any of the example configuration determiner 310, the example sensor interface 320, the example thrust state determiner 330, the example command generator 340, and/or, more generally, the example vertical limit controller 210 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example configuration determiner 310, the example sensor interface 320, the example thrust state determiner 330, and/or the example command generator 340 is/are hereby expressly defined to include a non-transitory computer readable storage device or storage disk such as a memory, a DVD, a CD, a Blu-ray disk, etc., including the software and/or firmware. Further still, the example vertical limit controller 210 of FIG. 2 may include one or more elements, processes, and/or devices in addition to, or instead of, those illustrated in FIG. 3, and/or may include more than one of any or all of the illustrated elements, processes, and devices.

Figure 4:
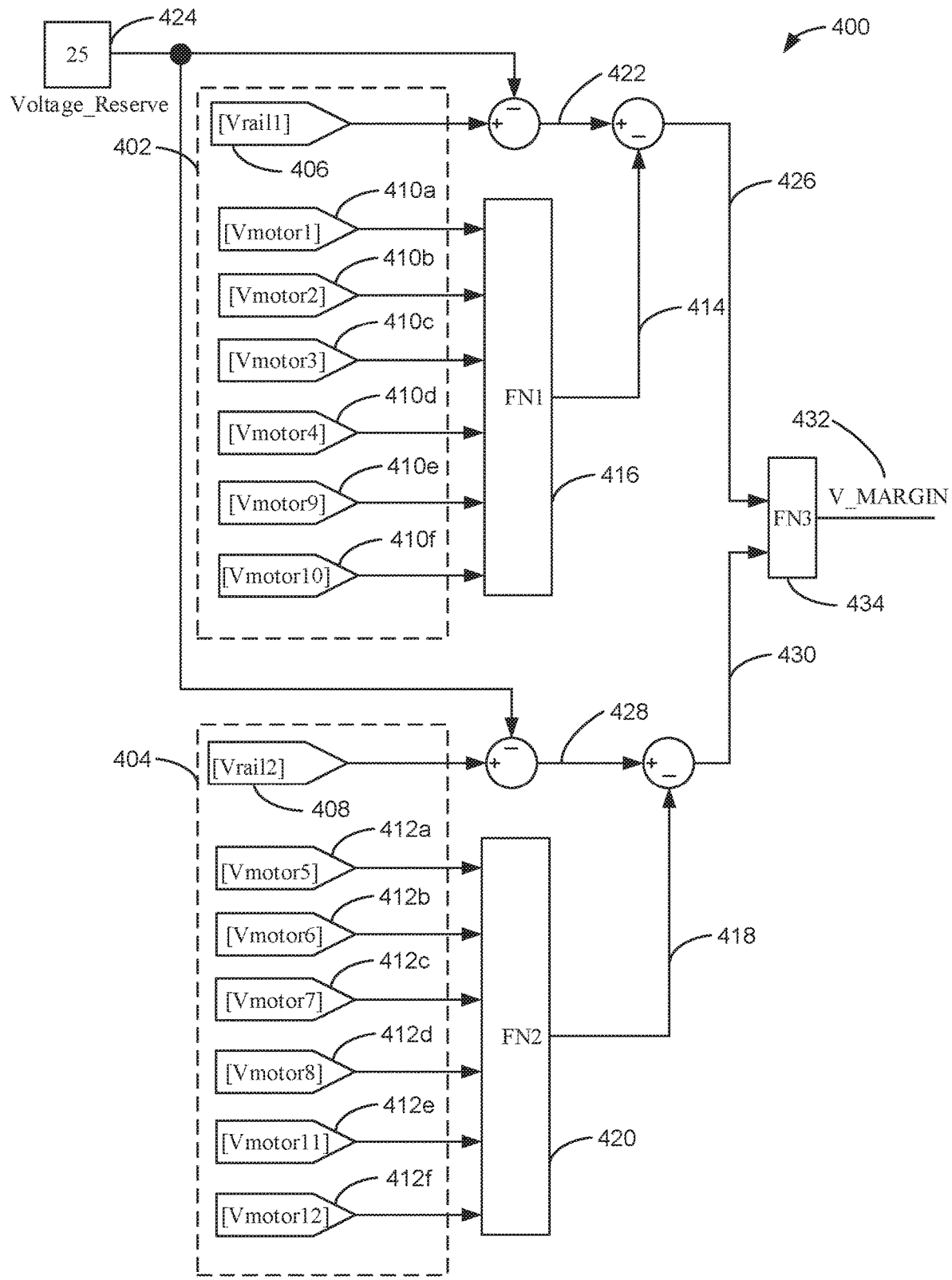
FIG. 4 depicts an example process for determining an example thrust margin by the example vertical limit controller of FIG. 3.

FIG. 4 depicts an example process 400 for determining a thrust margin (e.g., a thrust state margin) by the vertical limit controller 210 of FIG. 3. In the process 400 of FIG. 4, the configuration determiner 310 of FIG. 3 can determine that a power distribution configuration of the aircraft 100 of FIGS. 1A-1B includes a first example power bus 402 and a second example power bus 404. Alternatively, the aircraft 100 may have fewer or more power buses than the first and second power buses 402, 404. Although the process 400 of FIG. 4 is depicted as being implemented using the first power bus 402 and the second power bus 404, the process 400 is not so limited. Accordingly, the process 400 of FIG. 4 may, in some examples, be reduced to one power bus (e.g., the first power bus 402) while, in other examples, be expanded to more than two power buses (e.g., three or more power buses including at least the first power bus 402 and the second power bus 404).

In the process 400 of FIG. 4, the first power bus 402 includes the motors 146 of the first, second, third, fourth, ninth, and tenth rotor assemblies 102, 104, 106, 108, 110, 118, 120 of FIGS. 1A-1B. In FIG. 4, the second power bus 404 includes the motors 146 of the fifth, sixth, seventh, eighth, eleventh, and twelfth rotor assemblies 112, 114, 116, 122, 124 of FIGS. 1A-1B based on the power distribution configuration 360.

In the process 400 of FIG. 4, the sensor interface 320 of FIG. 3 can obtain measurements associated with the power buses 402, 404. For example, the sensor interface 320 may obtain a voltage measurement associated with the power sources 152, 154 of FIG. 1A. For example, the sensor interface 320 can determine a first power source state associated with the first power source 152 and a second power source state associated with the second power source 154. For example, the first power source state can be a value of an electrical parameter associated with the first power source 152, such as a current, a voltage, a power draw from the first power source, etc. In FIG. 4, the first power source state can correspond to a first example power source voltage 406 labeled "Vrail1" in FIG. 4 that corresponds to a first voltage measurement of the first power source 152 of FIG. 1A. In FIG. 4, the second power source state can correspond to a second example power source voltage 408 labeled "Vrail2" in FIG. 4 that corresponds to a second voltage measurement of the second power source 154 of FIG. 1A.

In the process 400 of FIG. 4, the thrust state determiner 330 determines first example thrust states 410a-f associated with the first power bus 402. For example, the sensor interface 320 can obtain a voltage measurement associated with the motor 146 of each of the first, second, third, fourth, ninth, and tenth rotor assemblies 102, 104, 106, 108, 110, 118, 120 of FIGS. 1A-1B. For example, the sensor interface 320 can determine a voltage that is labeled "Vmotor1" in FIG. 4 that corresponds to a voltage measurement associated with the motor 146 of the first rotor assembly 102 of FIGS. 1A-1B. In such examples, the thrust state determiner 330 can determine the first thrust state 410a as the voltage "Vmotor1".

In the process 400 of FIG. 4, the thrust state determiner 330 determines second example thrust states 412a-f associated with the second power bus 404. For example, the sensor interface 320 can obtain a voltage measurement associated with the motor 146 of each of the fifth, sixth, seventh, eighth, eleventh, and twelfth rotor assemblies 112, 114, 116, 122, 124 of FIGS. 1A-1B. For example, the sensor interface 320 can determine a voltage that is labeled "Vmotor5" in FIG. 4 that corresponds to a voltage measurement associated with the motor 146 of the fifth rotor assembly 110 of FIGS. 1A-1B. In such examples, the thrust state determiner 330 can determine the fifth thrust state 412a as the voltage "Vmotor5".

In the process 400 of FIG. 4, the thrust state determiner 330 determines a first example power bus thrust state 414 by executing a first example function (FN1) 416. In FIG. 4, the thrust state determiner 330 determines a second example power bus thrust state 418 by executing a second example function (FN2) 420. In FIG. 4, the first and second functions 416, 420 are the same. In other examples, the first and second functions 416, 420 can be different.

In the process 400 of FIG. 4, the functions 416, 420 correspond to minimizing functions, maximizing functions, averaging functions, etc., based on a vertical control profile of the aircraft 100 of FIGS. 1A-1B. For example, if the vertical control profile is indicative of the aircraft 100 employing maximum thrust state margins (e.g., a conservative vertical control profile), the functions 416, 420 can determine a maximum value of the first thrust states 410a-f and the second thrust states 412a-f. In such examples, the first power bus thrust state 414 can correspond to a higher or greater one of the first thrust states 410a-f and the second power bus thrust state 418 can correspond to a highest one of the second thrust states 412a-f.

In other examples, if the vertical control profile is indicative of the aircraft 100 employing minimum thrust state margins (e.g., an aggressive vertical control profile), the functions 416, 420 can determine a minimum value of the first thrust states 410a-f and the second thrust states 412a-f. In such examples, the first power bus thrust state 414 can correspond to a lowest one of the first thrust states 410a-f and the second power bus thrust state 418 can correspond to a lowest one of the second thrust states 412a-f.

In the process 400 of FIG. 4, the thrust state determiner 330 determines a first difference 422 between an example reserve voltage 424 labeled "Voltage Reserve" in FIG. 4 and the first power source voltage 406. For example, the first difference 422 can correspond to a first adjusted power source state based on a difference between the first power source state and the reserve voltage 424. In FIG. 4, the reserve voltage 424 is 25 V while, in other examples, the reserve voltage can be any other value such as 0 V, 10 V, 20 V, etc. In some examples, the reserve voltage 424 is a reserve state that can correspond to a quantity of energy that can be reserved or saved for a specific flight situation such as an emergency landing or when additional thrust is needed (e.g., a manual override).

In the process 400 of FIG. 4, the thrust state determiner 330 determines a first example power bus thrust state margin 426 by determining a difference between the first difference 422 and the first power bus thrust state 414. For example, the first power bus thrust state margin 426 is a margin or difference between (1) current or instantaneous thrust states of motors powered by the first power bus 402 and (2) available power that can be delivered from the first power bus 402 to the motors electrically coupled to the first power bus 402, where the available power is based on a difference between the reserve voltage 424 and the first power source voltage 406.

In the process of FIG. 4, the thrust state determiner 330 determines a second difference 428 between the reserve voltage 424 and the second power source voltage 408. For example, the second difference 428 can correspond to a second adjusted power source state based on a difference between the second power source state and the reserve voltage 424. In FIG. 4, the thrust state determiner 330 determines a second example power bus thrust state margin 430 by determining a difference between the second difference 428 and the second power bus thrust state 418. For example, the second power bus thrust state margin 430 is a margin or difference between (1) current or instantaneous thrust states of motors powered by the second power bus 404 and (2) available power that can be delivered from the second power bus 404 to the motors electrically coupled to the second power bus 404, where the available power is based on a difference between the reserve voltage 424 and the second power source voltage 408.

In the process of FIG. 4, the thrust state determiner 330 identifies the first power bus thrust state margin 426 and the second power bus thrust state margin 430 as candidate thrust state margins because one of the power bus thrust state margins 426, 430 may be selected as an example thrust state margin 432. In FIG. 4, the thrust state determiner 330 determines the thrust state margin 432 by executing a third example function (FN3) 434 on the first power bus thrust state margin 426 and the second power bus thrust state margin 430. The third function 434 can correspond to a minimizing function, a maximizing function, an averaging function, etc., based on the vertical control profile of the aircraft 100 of FIGS. 1A-1B. For example, if the vertical control profile is indicative of the aircraft 100 employing maximum thrust state margins, the third functions 434 can determine a maximum value of the first and second power thrust state margins 426, 430. In such examples, the thrust state margin 432 can correspond to a higher or greater one of the first power thrust state margin 426 and the second power thrust state margin 430. In FIG. 4, the functions 416, 420, 434 are the same. In other examples, the one or more of the functions 416, 420, 434 can be different.

Figure 5:
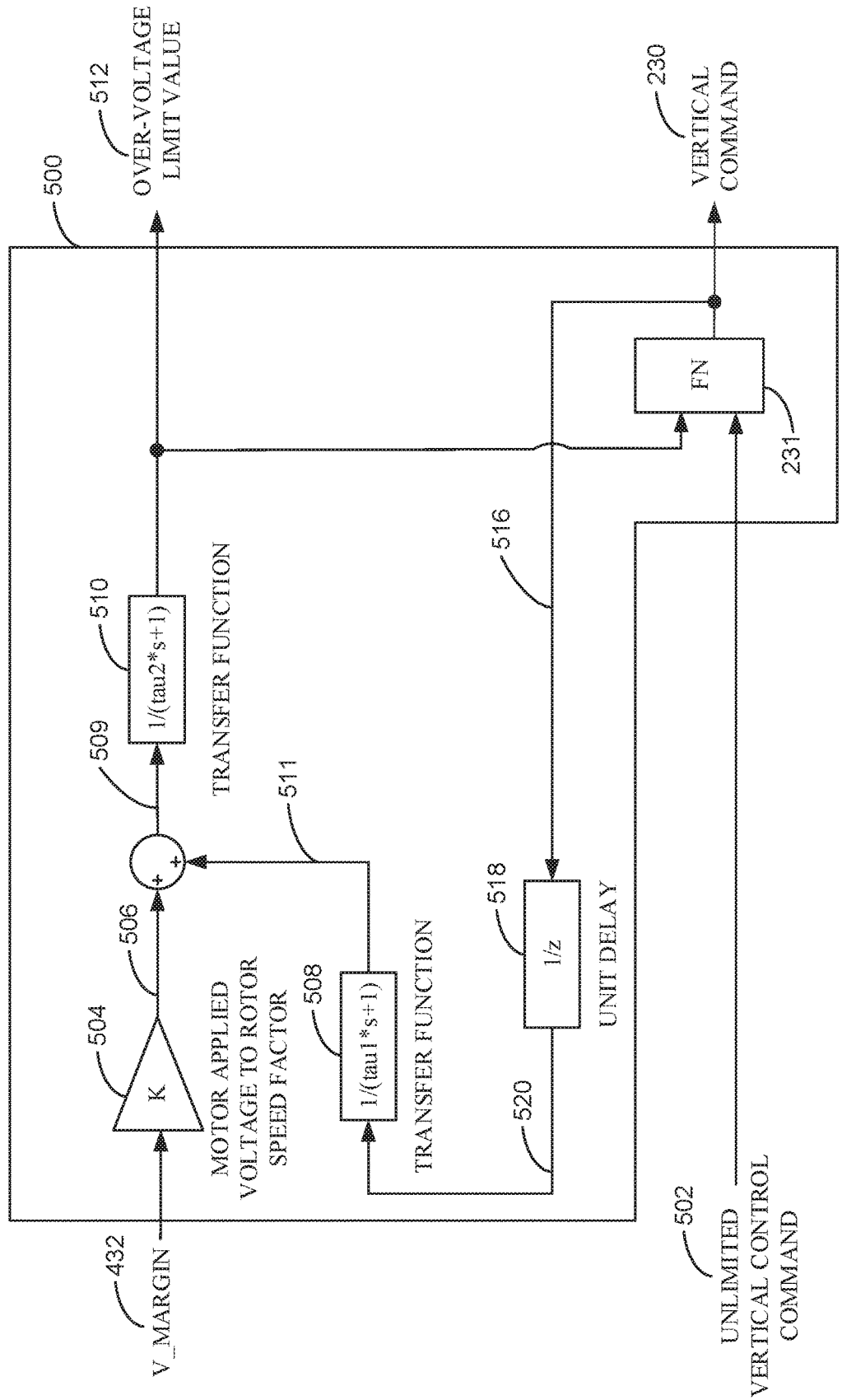
FIG. 5 depicts an example process for generating an example vertical command by the example vertical limit controller of FIG. 3.

FIG. 5 depicts an example process 500 for generating the vertical command 230 of FIG. 2 by the vertical limit controller 210 of FIG. 3. For example, the process 500 can correspond to hardware logic, machine readable instructions, hardware implemented state machines, and/or any combination thereof. For example, the command generator 340 of FIG. 3 can execute and/or otherwise implement the process 500 to generate the vertical command 230. In FIG. 5, the command generator 340 obtains the thrust state margin 432 of FIG. 4 calculated by the thrust state determiner 330 of FIG. 3. In FIG. 5, the command generator 340 obtains an example unlimited vertical control command 502 that can correspond to one or more actuator commands that, when invoked by the aircraft 100, can result in the aircraft 100 executing an unlimited vertical control command. For example, the unlimited vertical control command 502 can correspond to the first actuator commands 220 generated by the vertical axis controller 202 of FIG. 2.

In the illustrated example of FIG. 5, the command generator 340 applies an example gain (e.g., a gain value) 504 to the thrust state margin 432 to generate a first example control value 506. For example, the first control value 506 can be a rotor speed in RPM. In FIG. 5, the gain 504 corresponds to a motor applied voltage to rotor speed factor. For example, the gain 504 may convert a voltage represented by the thrust state margin 432 into a speed of the rotor 144 of FIG. 1A. In FIG. 5, the command generator 340 adds the first control value 506 to an output of a first example transfer function 508. For example, the output of the first transfer function 508 can be a feedback value based on the vertical command 230 of FIG. 2.

In the illustrated example of FIG. 5, the command generator 340 applies a second example control value 509 to a second example transfer function 510. The second control value 509 is based on an addition of the first control value 506 and a third example control value 511. The third control value 511 is an output of the first transfer function 508. For example, the second transfer function 510 can convert an input rotor speed (e.g., the second control value 509) to a fourth example control value 512. The fourth control value 512 can be an over-voltage limit value that, when applied to the motor 146 operatively coupled to the rotor 144 of FIG. 1A, invokes the motor 146 to generate a reduced rotor speed compared to the input rotor speed. Advantageously, the reduced rotor speed can enable the aircraft 100 of FIGS. 1A-1B to have available power for sufficient attitude control by reducing power allocated for vertical control. The fourth control value 512 can correspond to a threshold (e.g., a threshold voltage) above that the vertical command 230 may, in some examples, not exceed. For example, the vertical command 230 may correspond to a limited vertical control command to prioritize attitude control over vertical control.

In the illustrated example of FIG. 5, the command generator 340 determines the vertical command 230 by executing the vertical command limiting function 231 of FIG. 2 using the fourth control value 512 and the unlimited vertical control command 502. For example, if the vertical command limiting function 231 is a minimizing function, the vertical command limiting function 231 may determine the vertical command 230 by determining a minimum or a smaller value of the fourth control value 512 and the unlimited vertical control command 502. In other examples, if the vertical command limiting function 231 is a maximizing function, the vertical command limiting function 231 may determine the vertical command 230 by determining a maximum or a larger value of the fourth control value 512 and the unlimited vertical control command 502. Alternatively, the vertical command limiting function 231 may be any other type of function, such as an averaging function.

In the illustrated example of FIG. 5, the command generator 340 determines the vertical command 230 based on an example feedback value 516. In FIG. 5, the feedback value 516 is a voltage that corresponds to the vertical command 230 being transmitted to the actuator mixing controller 212 of FIG. 2. The command generator 340 applies an example unit delay (e.g., a unit delay function) 518 to the feedback value 516 to a generate an example delayed feedback value 520. The first transfer function 508 obtains the delayed feedback value 520 to generate an output that corresponds to a delayed value of a rotor speed previously transmitted to the actuator mixing controller 212. Advantageously, the command generator 340 can generate (e.g., iteratively generate) the fourth control value 512 based on the feedback value 516 to ensure stability control of the control loop implemented by the process 500.

Figure 6:
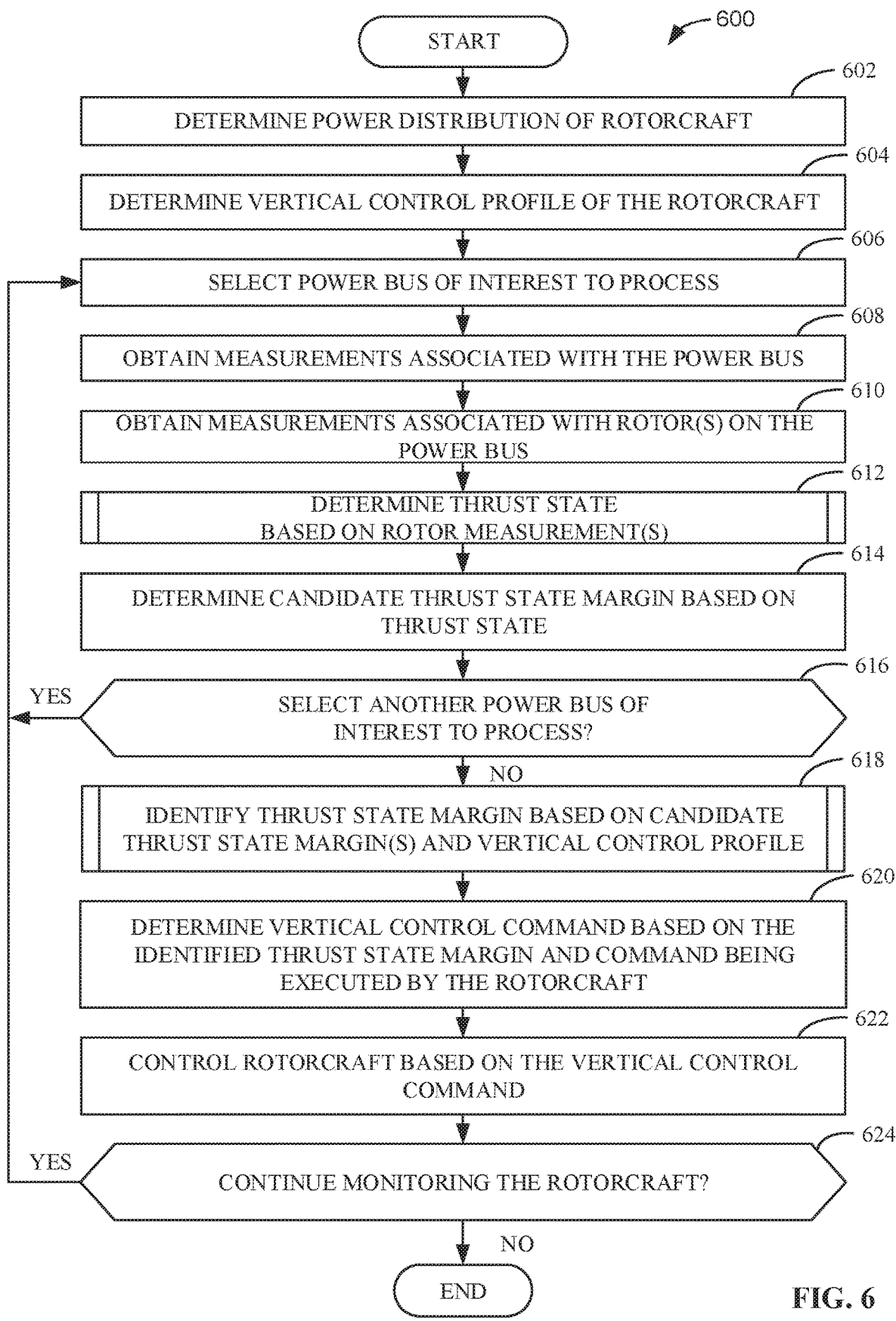
FIG. 6 is a flowchart representative of example machine readable instructions that may be executed to implement the example controller of FIG. 2 to control the example aircraft of FIGS. 1A-1B.
Figure 7:
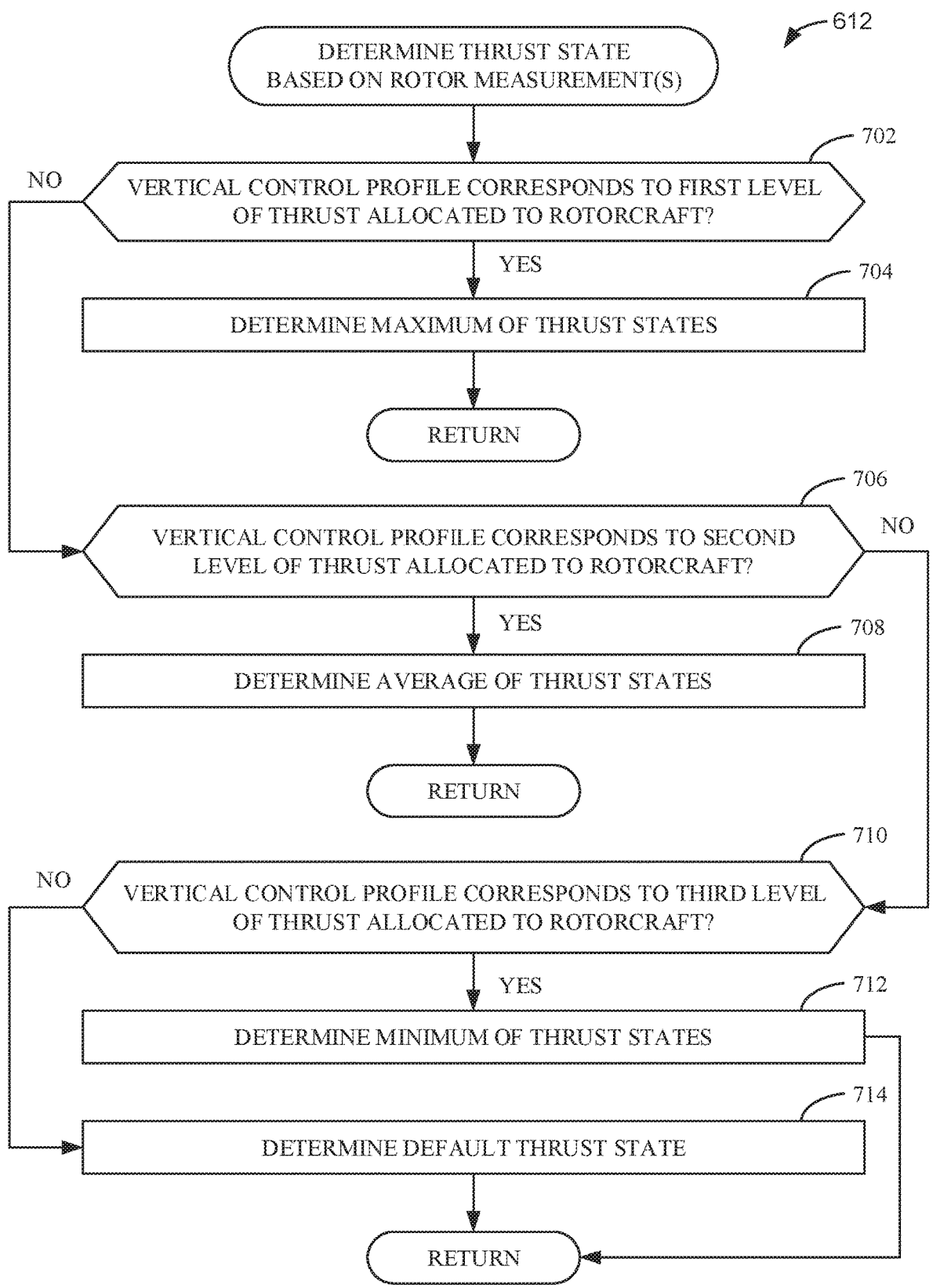
FIG. 7 is a flowchart representative of example machine readable instructions that may be executed to implement the example controller of FIG. 2 to determine a thrust state based on rotor measurement(s).
Figure 8:
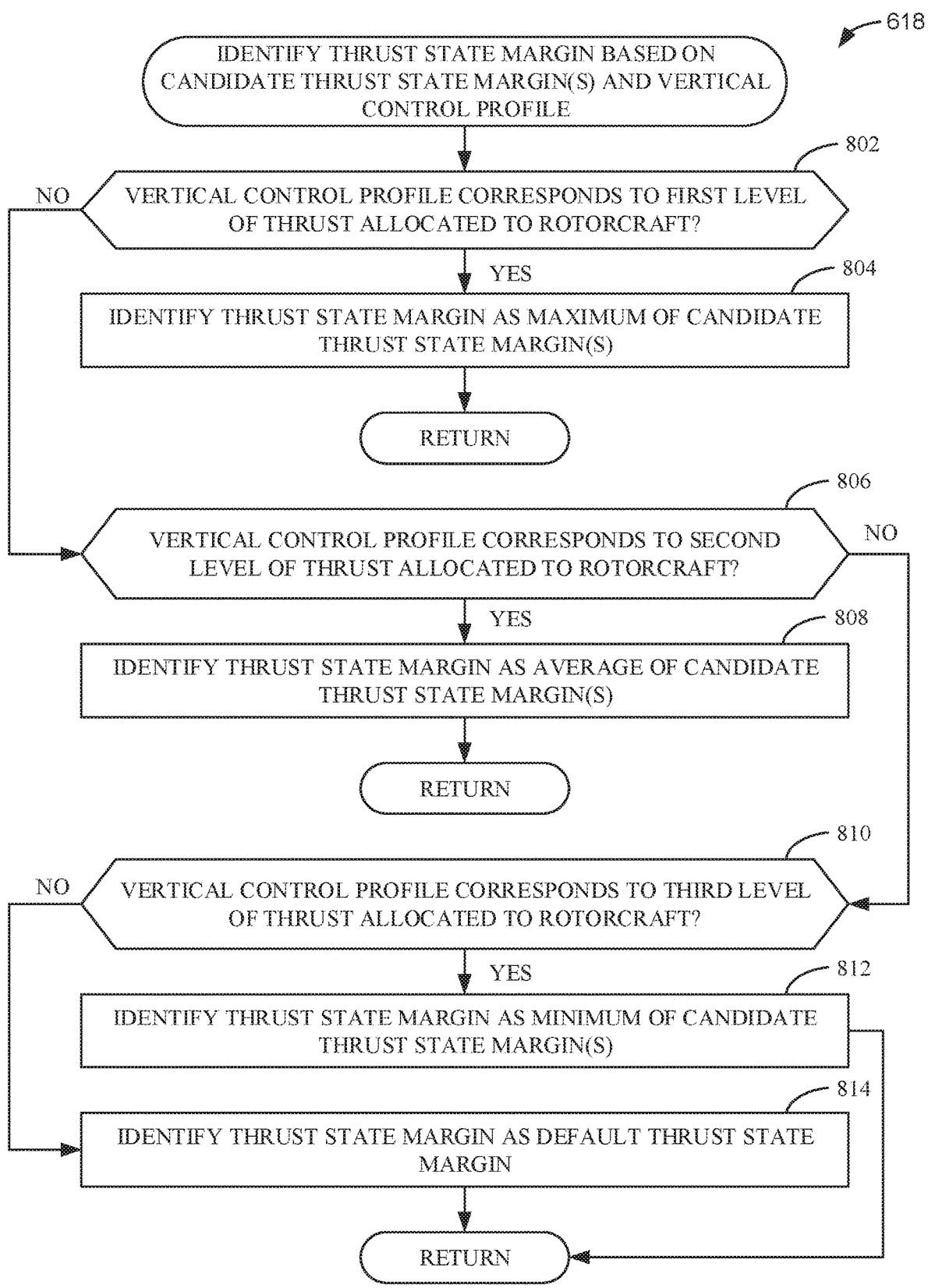
FIG. 8 is a flowchart representative of example machine readable instructions that may be executed to implement the example controller of FIG. 2 to identify a thrust state margin based on candidate thrust state margin(s) and a vertical control profile of the example aircraft of FIGS. 1A-1B.

Flowcharts representative of example hardware logic, machine readable instructions, hardware implemented state machines, and/or any combination thereof for implementing the vertical limit controller 210 of FIGS. 2-3 and/or, more generally, the controller 150 of FIGS. 1A and/or 2 is shown in FIGS. 6-8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6-8, many other methods of implementing the example vertical limit controller 210 and/or, more generally, the controller 150 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of example machine readable instructions 600 that may be executed to implement the controller 150 of FIGS. 1A and/or 2 to control the aircraft 100 of FIGS. 1A-1B. The machine readable instructions 600 begin at block 602, at which the controller 150 determines a power distribution of a rotorcraft. For example, the configuration determiner 310 (FIG. 3) may query the database 350 (FIG. 3) for the power distribution configuration 360 (FIG. 3) of the aircraft 100 of FIGS. 1A-1B. In such examples, the configuration determiner 310 can determine that the aircraft 100 has a power distribution topology including the first power bus 402 and the second power bus 404 of FIG. 4.

At block 604, the controller 150 determines a vertical control profile of the rotorcraft. For example, the configuration determiner 310 may query the database 350 (FIG. 3) for the vertical control profile 370 of the aircraft 100. In such examples, the configuration determiner 310 can determine that the vertical control profile 370 is indicative of minimizing thrust margins, maximizing thrust margins, etc. In such examples, the configuration determiner 310 can determine that the vertical control profile 370 is indicative of minimizing thrust state margins that, in turn, is indicative of the functions 416, 420, 434 being minimizing functions.

At block 606, the controller 150 selects a power bus of interest to process. For example, the thrust state determiner 330 (FIG. 3) may select the first power bus 402 to process.

At block 608, the controller 150 obtains measurements associated with the power bus. For example, the sensor interface 320 may obtain the first power source voltage 406 of FIG. 4 from the first power source sensor 156. In such examples, the thrust state determiner 330 can determine that the first power source state is the first power source voltage 406. Alternatively, the thrust state determiner 330 can determine that the first power source state is based on a current, a power draw, etc., of the first power source 152.

At block 610, the controller 150 obtains measurements associated with rotor(s) on the power bus. For example, the sensor interface 320 may obtain measurements from the sensor 148 of one or more of the rotor assemblies 102-124 of FIGS. 1A-1B associated with the first power bus 402. In such examples, the sensor interface 320 can obtain a voltage measurement being applied to and/or otherwise consumed by the motor 146 of corresponding ones of the rotor assemblies 102-124 associated with the first power bus 402.

At block 612, the controller 150 determines a thrust state based on rotor measurement(s). For example, the thrust state determiner 330 may determine the first power bus thrust state 414 of FIG. 4 by executing the first function 416 on the thrust states 410a-410f of FIG. 4, where the thrust states 410a-410f are based on voltage measurements associated with the motor 146 of the first, second, third, fourth, ninth, and tenth rotor assemblies 102, 104, 106, 108, 110, 118, 120 of FIGS. 1A-1B. An example process for implementing block 612 is described below in connection with FIG. 7.

At block 614, the controller 150 determines a candidate thrust state margin based on the thrust state. For example, the thrust state determiner 330 may determine the first power bus thrust state margin 426 of FIG. 4 based on a difference between the first power bus thrust state 414 and the first difference 422 of FIG. 4. In such examples, the thrust state determiner 330 can identify the first power bus thrust margin 426 as a candidate thrust state margin.

At block 616, the controller 150 determines whether to select another power bus of interest to process. For example, the thrust state determiner 330 may select the second power bus 404 of FIG. 4 to process.

If, at block 616, the controller 150 determines to select another power bus of interest to process, control returns to block 606 to select another power bus of interest to process. If, at block 616, the controller 150 determines not to select another power bus of interest to process, then, at block 618, the controller 150 identifies a thrust state margin based on the candidate thrust state margin(s) and a vertical control profile. For example, the thrust state determiner 330 may determine the thrust state margin 432 of FIG. 4 by executing the third function 434 of FIG. 3. In such examples, the third function 434 can be a minimizing function, a maximizing function, an averaging function, etc., based on the vertical control profile 370 of the aircraft 100 of FIGS. 1A-1B. An example process for implementing block 616 is described below in connection with FIG. 8.

At block 620, the controller 150 determines a vertical control command based on the identified thrust state margin and a command being executed by the rotorcraft. For example, the command generator 340 (FIG. 3) may determine the vertical command 230 based on the thrust state margin 432 and the first actuator commands 220 of FIG. 2 (e.g., the unlimited vertical control command 502 of FIG. 5).

At block 622, the controller 150 controls the rotorcraft based on the vertical control command. For example, the actuator mixing controller 212 (FIG. 2) of the controller 150 may generate one or more actuator commands to invoke the aircraft 100 to behavior, function, and/or otherwise operate based on the aircraft dynamics 232 of FIG. 2. In such examples, the actuator mixing controller 212 can generate and transmit commands to the rotor assemblies 102-124 based on a blending, a mixing, and/or another fusion of one or more of the vertical commands 230, the second actuator commands 222, the third actuator commands 224, and/or the fourth actuator commands 226 to invoke, instruct, and/or otherwise direct the aircraft 100 to move from a first location to a second location, a first altitude to a second altitude, a first orientation to a second orientation, etc., and/or a combination thereof. For example, the actuator mixing controller 212 can generate and transmit commands to the rotor assemblies 102-124 to control flight of the aircraft 100 of FIGS. 1A-1B.

At block 624, the controller 150 determines whether to continue monitoring the rotorcraft. If, at block 624, the controller 150 determines to continue monitoring the rotorcraft, control returns to block 606 to select a power bus of interest to process, otherwise the machine readable instructions 600 of FIG. 6 conclude.

FIG. 7 is a flowchart representative of the machine readable instructions 612 of FIG. 6 that may be executed to implement the controller 150 of FIG. 2 to determine a thrust state based on rotor measurement(s). The process of FIG. 7 may be used to implement block 612 of FIG. 6. The machine readable instructions 612 of FIG. 7 begin at block 702, at which the controller 150 determines whether a vertical control profile corresponds to a first level of thrust allocated to the rotorcraft. For example, the configuration determiner 310 (FIG. 3) may obtain the vertical control profile 370 of FIG. 3. In such examples, the configuration determiner 310 can determine that the vertical control profile 370 corresponds to a first level of thrust (e.g., a conservative vertical control profile, a conservative power profile, etc.), a second level of thrust (e.g., an average vertical control profile, an average power profile, etc.), a third level of thrust (e.g., an aggressive vertical control profile, a non-conservative power profile, an aggressive power profile, etc.), etc., that can be allocated to one or more of the rotor assemblies 102-124 of FIGS. 1A-1B. For example, the levels of thrust can be based on a desired, intended, or thrust margin of interest. In such examples, the first level of thrust can correspond to a first thrust margin, the second level of thrust can correspond to a second thrust margin less than the first thrust margin, and the third level of thrust can correspond to a third thrust margin less than the second thrust margin. Accordingly, the first level of thrust can be indicative of the functions 416, 420, 434 of FIG. 4 being maximizing functions, the second level of thrust can be indicative of the functions 416, 420, 434 of FIG. 4 being averaging functions, and the third level of thrust can be indicative of the functions 416, 420, 434 of FIG. 4 being minimizing functions.

If, at block 702, the controller 150 determines that the vertical control profile corresponds to the first level of thrust allocated to the rotorcraft, then, at block 704, the controller 150 determines a maximum of thrust states. For example, the thrust state determiner 330 (FIG. 3) may invoke the first function 416 of FIG. 4 to determine the first power bus thrust state 414 as a maximum value of the first thrust states 410a-410f. In response to determining the maximum of the thrust states at block 704, the machine readable instructions 612 of FIG. 7 return to block 614 of the machine readable instructions 600 of FIG. 6 to determine a candidate thrust state margin based on the thrust state.

If, at block 702, the controller 150 determines that the vertical control profile does not correspond to the first level of thrust allocated to the rotorcraft, control proceeds to block 706 to determine whether the vertical control profile corresponds to the second level of thrust allocated to the rotorcraft.

If, at block 706, the controller 150 determines that the vertical control profile corresponds to the second level of thrust allocated to the rotorcraft, then, at block 708, the controller 150 determines an average of thrust states. For example, the thrust state determiner 330 may invoke the first function 416 of FIG. 4 to determine the first power bus thrust state 414 as an average value of the first thrust states 410a-410f. In response to determining the average of the thrust states at block 708, the machine readable instructions 612 of FIG. 7 return to block 614 of the machine readable instructions 600 of FIG. 6 to determine a candidate thrust state margin based on the thrust state.

If, at block 706, the controller 150 determines that the vertical control profile does not correspond to the second level of thrust allocated to the rotorcraft, control proceeds to block 710 to determine whether the vertical control profile corresponds to the third level of thrust allocated to the rotorcraft.

If, at block 710, the controller 150 determines that the vertical control profile corresponds to the third level of thrust allocated to the rotorcraft, then, at block 712, the controller 150 determines a minimum of thrust states. For example, the thrust state determiner 330 may invoke the first function 416 of FIG. 4 to determine the first power bus thrust state 414 as a minimum value of the first thrust states 410a-410f. In response to determining the minimum of the thrust states at block 712, the machine readable instructions 612 of FIG. 7 return to block 614 of the machine readable instructions 600 of FIG. 6 to determine a candidate thrust state margin based on the thrust state.

If, at block 710, the controller 150 determines that the vertical control profile does not correspond to the third level of thrust allocated to the rotorcraft, control proceeds to block 714 to determine a default thrust state. For example, the thrust state determiner 330 may determine a pre-defined value for the first power bus thrust state 414. In such examples, the pre-defined value may be stored in the database 350. In response to determining the default thrust state at block 714, the machine readable instructions 612 of FIG. 7 return to block 614 of the machine readable instructions 600 of FIG. 6 to determine a candidate thrust state margin based on the thrust state.

FIG. 8 is a flowchart representative of the machine readable instructions 618 of FIG. 6 that may be executed to implement the controller 150 of FIG. 2 to identify a thrust state margin based on candidate thrust state margin(s) and a vertical control profile of the aircraft 100 of FIGS. 1A-1B. The process of FIG. 8 may be used to implement block 618 of FIG. 6. The machine readable instructions 618 of FIG. 8 begin at block 802, at which the controller 150 determines whether the vertical control profile corresponds to the first level of thrust allocated to the rotorcraft.

If, at block 802, the controller 150 determines that the vertical control profile corresponds to the first level of thrust allocated to the rotorcraft, then, at block 804, the controller 150 identifies a thrust state margin as a maximum of the candidate thrust state margin(s). For example, the thrust state determiner 330 (FIG. 3) may invoke the third function 434 of FIG. 4 to determine the thrust state margin 432 of FIG. 4 as a maximum value of the first power bus thrust state margin 426 and the second power bus thrust state margin 430. In response to identifying the thrust state margin as the maximum of the candidate thrust state margin(s) at block 804, the machine readable instructions 618 of FIG. 8 return to block 620 of the machine readable instructions 600 of FIG. 6 to determine the vertical control command based on the identified thrust state margin and the command being executed by the rotorcraft.

If, at block 802, the controller 150 determines that the vertical control profile does not correspond to the first level of thrust allocated to the rotorcraft, control proceeds to block 806 to determine whether the vertical control profile corresponds to the second level of thrust allocated to the rotorcraft.

If, at block 806, the controller 150 determines that the vertical control profile corresponds to the second level of thrust allocated to the rotorcraft, then, at block 808, the controller 150 identifies a thrust state margin as an average of the candidate thrust state margin(s). For example, the thrust state determiner 330 may invoke the third function 434 of FIG. 4 to determine the thrust state margin 432 of FIG. 4 as an average value of the first power bus thrust state margin 426 and the second power bus thrust state margin 430. In response to identifying the thrust state margin as the average of the candidate thrust state margin(s) at block 808, the machine readable instructions 618 of FIG. 8 return to block 620 of the machine readable instructions 600 of FIG. 6 to determine the vertical control command based on the identified thrust state margin and the command being executed by the rotorcraft.

If, at block 806, the controller 150 determines that the vertical control profile does not correspond to the second level of thrust allocated to the rotorcraft, control proceeds to block 810 to determine whether the vertical control profile corresponds to the third level of thrust allocated to the rotorcraft.

If, at block 810, the controller 150 determines that the vertical control profile corresponds to the third level of thrust allocated to the rotorcraft, then, at block 812, the controller 150 identifies a thrust state margin as a minimum of the candidate thrust state margin(s). For example, the thrust state determiner 330 may invoke the third function 434 of FIG. 4 to determine the thrust state margin 432 of FIG. 4 as a minimum value of the first power bus thrust state margin 426 and the second power bus thrust state margin 430. In response to identifying the thrust state margin as the minimum of the candidate thrust state margin(s) at block 812, the machine readable instructions 618 of FIG. 8 return to block 620 of the machine readable instructions 600 of FIG. 6 to determine the vertical control command based on the identified thrust state margin and the command being executed by the rotorcraft.

If, at block 810, the controller 150 determines that the vertical control profile does not correspond to the third level of thrust allocated to the rotorcraft, control proceeds to block 814 to identify the thrust state margin as a default thrust state margin. For example, the thrust state determiner 330 may determine a pre-defined value for the thrust state margin 432. In such examples, the pre-defined value may be stored in the database 350 (FIG. 3). In response to identifying the thrust state margin as the default thrust state margin at block 814, the machine readable instructions 618 of FIG. 8 return to block 620 of the machine readable instructions 600 of FIG. 6 to determine the vertical control command based on the identified thrust state margin and the command being executed by the rotorcraft.

Figure 9:
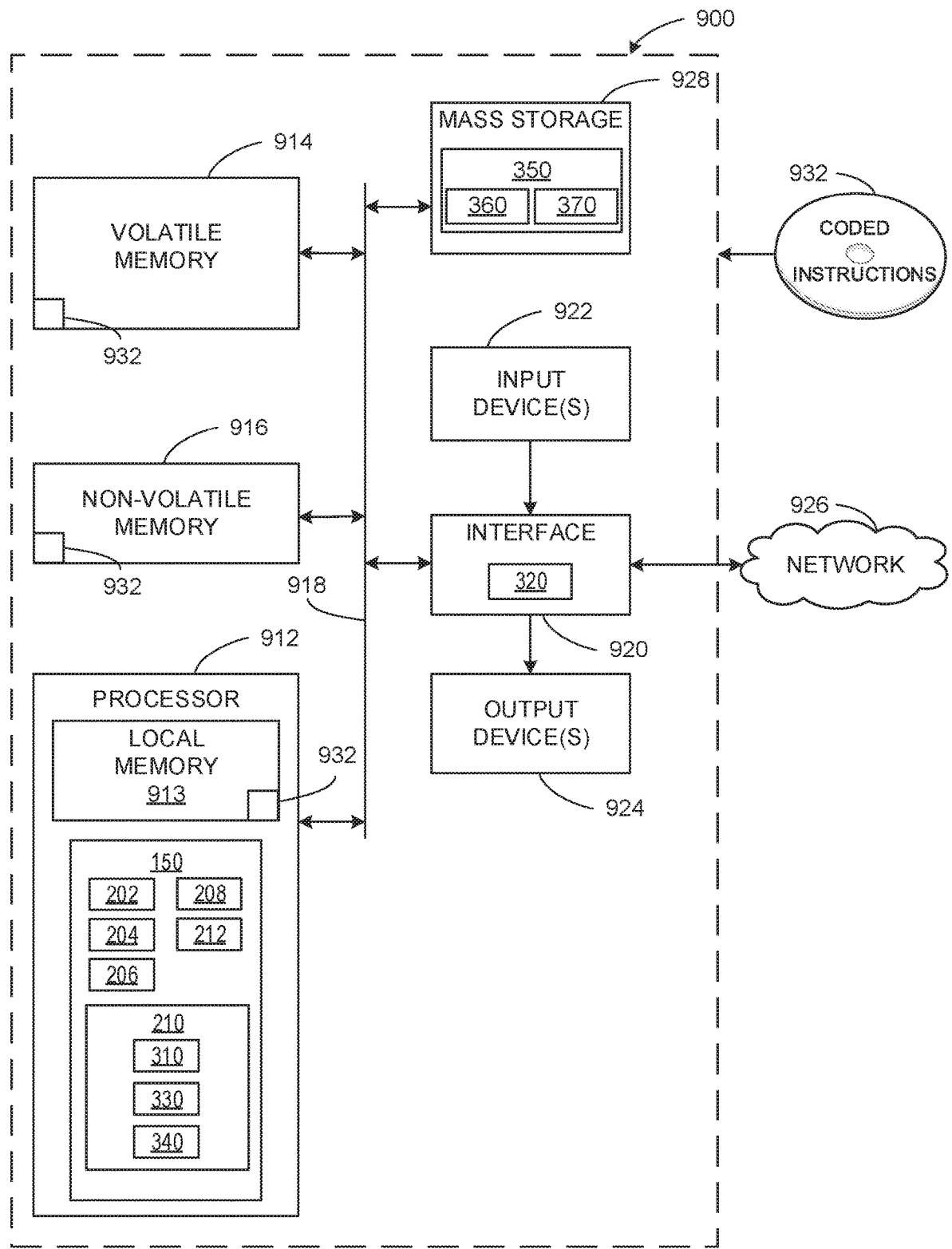
FIG. 9 is a block diagram of an example processing platform structured to execute the example machine readable instructions of FIGS. 6-8 to implement the example controller of FIG. 2.

FIG. 9 is a block diagram of an example processor platform 900 structured to execute the instructions of FIGS. 6-8 to implement the vertical limit controller 210 of FIGS. 2-3 and/or, more generally, the controller 150 of FIGS. 1A and/or 2. The processor platform 900 can be, for example, a flight control computer, a server, a workstation, a self-learning machine (e.g., a neural network), a mobile device (e.g., a cell phone, a smart phone, a tablet such as an iPad™), a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example vertical axis controller 202, the example pitch axis controller 204, the example roll axis controller 206, the example yaw axis controller 208, the example vertical limit controller 210, and the example actuator mixing controller 212 of FIG. 2, and the example configuration determiner 310, the example thrust state determiner 330, and the command generator 340 of FIG. 3.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, a satellite system, a line-of-site wireless system, a cellular telephone system, etc., and/or any other wireless communication method.

The processor platform 900 of the illustrated example also includes one or more mass storage devices 928 for storing software and/or data. Examples of such mass storage devices 928 include hard drive disks, CD drives, redundant array of independent disks (RAID) systems, and DVD drives. In this example, the one or more mass storage devices 928 implement the example database 350, the example power distribution configuration 360, and the example vertical control profile(s) 370 of FIG. 3.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus, and articles of manufacture have been disclosed that facilitate flight control prioritization of attitude control. In an example where both attitude and vertical control cannot be achieved due to electrical state limits in an electric multi-rotor aircraft, the disclosed methods, apparatus, and articles of manufacture prioritize attitude control by integrating the attitude control and electrical power systems to down select an upper limit to an allowable vertical control at all times. Prior to down selecting the upper limit, the disclosed methods, apparatus, and articles of manufacture can compute and/or otherwise calculate thrust margins for all rotors individually. In response to the thrust margin calculations, the disclosed methods, apparatus, and articles of manufacture can apply a selection scheme (e.g., a maximum thrust margin selection scheme, a minimum thrust margin selection scheme, an averaging thrust margin selection scheme, etc., and/or a combination thereof) to the calculated thrust margins. By down selecting the upper limit, the disclosed methods, apparatus, and articles of manufacture can ensure sufficient attitude control capability while permitting acceptable vertical control power. In response to down selecting the upper limit, the disclosed methods, apparatus, and articles of manufacture can convert the down selected upper limit to a vertical control limit value and apply the vertical control limit value to a previous or instant vertical control command to prioritize attitude control.

The disclosed methods, apparatus, and articles of manufacture improve the efficiency of using a computing device of a multi-rotor aircraft by determining a thrust state margin by down selecting from a plurality of thrust states to a single thrust state. Advantageously, commands can be generated using less computing power, memory, storage space, etc., and/or a combination thereof to affect aircraft dynamics of the multi-rotor aircraft because the commands can be generated based on a single thrust state margin instead of from the plurality of thrust states. The disclosed methods, apparatus, and articles of manufacture are accordingly directed to one or more improvement(s) in the functioning of a computer.

Example methods, apparatus, systems, and articles of manufacture for flight control prioritization are disclosed herein. Further examples and combinations thereof include the following:

Example 1 includes an apparatus to control flight of a rotorcraft, the apparatus comprising a thrust state determiner to determine a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source, determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source, and identify the first thrust margin or the second thrust margin as a selected thrust margin based on a vertical control profile of the rotorcraft, and a command generator to determine a first vertical control command based on the selected thrust margin and a second vertical control command, the second vertical control command being executed by the rotorcraft, and control the rotorcraft based on the first vertical control command.

Example 2 includes the apparatus of example 1, wherein the rotorcraft is an unmanned aerial vehicle, the first rotors including two or more rotors electrically coupled to the first power source, and the second rotors including two or more rotors electrically coupled to the second power source, and further including a sensor interface to obtain the first measurements associated with the first two or more rotors and obtain the second measurements associated with the second two or more rotors.

Example 3 includes the apparatus of example 1, wherein at least one of the first power source or the second power source includes one or more batteries, and at least one of the first measurements or the second measurements are based on at least one of a temperature, a current, or a voltage associated with the one or more batteries, and further including a sensor interface to obtain the at least one of the temperature, the current, or the voltage.

Example 4 includes the apparatus of example 1, wherein the vertical control profile is a first vertical control profile, the first rotors including at least a first rotor and a second rotor, the first measurements including at least a first measurement corresponding to the first rotor and a second measurement corresponding to the second rotor, and the thrust state determiner is to determine the first thrust state based on the first measurement being greater than at least the second measurement based on the first vertical control profile, the first vertical control profile corresponding to a first level of thrust allocated to vertical control of the rotorcraft, determine the first thrust state based on an average of at least the first measurement and the second measurement based on a second vertical control profile, the second vertical control profile corresponding to a second level of thrust allocated to the vertical control of the rotorcraft, the second level of thrust less than the first level of thrust, and determine the first thrust state based on the first measurement being less than at least the second measurement based on a third vertical control profile, the third vertical control profile corresponding to a third level of thrust allocated to the vertical control of the rotorcraft, the third level of thrust less than the second level of thrust.

Example 5 includes the apparatus of example 1, wherein the vertical control profile is a first vertical control profile, and the thrust state determiner is to identify the selected thrust margin by selecting the first thrust margin based on the first thrust margin being greater than at least the second thrust margin when the vertical control profile corresponds to a first level of thrust allocated to vertical control of the rotorcraft, selecting the first thrust margin based on an average of at least the first thrust margin and the second thrust margin when the vertical control profile corresponds to a second level of thrust allocated to the vertical control of the rotorcraft, the second level of thrust less than the first level of thrust, and selecting the first thrust margin based on the first thrust margin being less than at least the second thrust margin when the vertical control profile corresponds to a third level of thrust allocated to vertical control of the rotorcraft, the third level of thrust less than the second level of thrust.

Example 6 includes the apparatus of example 1, wherein the thrust state determiner is to determine a first difference between the first thrust state and a reserve state, determine a second difference between the second thrust state and the reserve state, and identify the selected thrust margin based on at least the first difference and the second difference.

Example 7 includes the apparatus of example 1, wherein the command generator is to determine a first control value by multiplying the selected thrust margin and a gain value, determine a second control value based on a sum of the first control value and a third control value, the third control value corresponding to an output from a first transfer function, determine a fourth control value by multiplying the second control value and a second transfer function different from the first transfer function, and determine the first vertical control command based on a minimum value of the fourth control value and the second vertical control command.

Example 8 includes a non-transitory computer readable storage medium comprising instructions that, when executed, cause a machine to at least determine a first thrust margin between a first limit of first available power for first rotors of a rotorcraft and a first thrust state associated with the first rotors, the first available power based on a first power source of the rotorcraft, the first thrust state based on first measurements associated with the first rotors powered by the first power source, determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source, identify the first thrust margin or the second thrust margin as a selected thrust margin based on a vertical control profile of the rotorcraft, determine a first vertical control command based on the selected thrust margin and a second vertical control command, the second vertical control command being executed by the rotorcraft, and control the rotorcraft based on the first vertical control command.

Example 9 includes the non-transitory computer readable storage medium of example 8, wherein the rotorcraft is an unmanned aerial vehicle, the first rotors including two or more rotors electrically coupled to the first power source, and the second rotors including two or more rotors electrically coupled to the second power source, and the instructions, when executed, cause the machine to obtain the first measurements associated with the first two or more rotors and obtain the second measurements associated with the second two or more rotors.

Example 10 includes the non-transitory computer readable storage medium of example 8, wherein at least one of the first power source or the second power source includes one or more batteries, and at least one of the first measurements or the second measurements are based on at least one of a temperature, a current, or a voltage associated with the one or more batteries, and wherein the instructions, when executed, cause the machine to obtain the at least one of the temperature, the current, or the voltage.

Example 11 includes the non-transitory computer readable storage medium of example 8, wherein the vertical control profile is a first vertical control profile, the first rotors including at least a first rotor and a second rotor, the first measurements including at least a first measurement corresponding to the first rotor and a second measurement corresponding to the second rotor, and the instructions, when executed, cause the machine to determine the first thrust state based on the first measurement being greater than at least the second measurement based on the first vertical control profile, the first vertical control profile corresponding to a first level of thrust allocated to vertical control of the rotorcraft, determine the first thrust state based on an average of at least the first measurement and the second measurement based on a second vertical control profile, the second vertical control profile corresponding to a second level of thrust allocated to the vertical control of the rotorcraft, the second level of thrust less than the first level of thrust, and determine the first thrust state based on the first measurement being less than at least the second measurement based on a third vertical control profile, the third vertical control profile corresponding to a third level of thrust allocated to the vertical control of the rotorcraft, the third level of thrust less than the second level of thrust.

Example 12 includes the non-transitory computer readable storage medium of example 8, wherein the vertical control profile is a first vertical control profile, and the instructions, when executed, cause the machine to identify the selected thrust margin by selecting the first thrust margin based on the first thrust margin being greater than at least the second thrust margin when the vertical control profile corresponds to a first level of thrust allocated to vertical control of the rotorcraft, selecting the first thrust margin based on an average of at least the first thrust margin and the second thrust margin when the vertical control profile corresponds to a second level of thrust allocated to the vertical control of the rotorcraft, the second level of thrust less than the first level of thrust, and selecting the first thrust margin based on the first thrust margin being less than at least the second thrust margin when the vertical control profile corresponds to a third level of thrust allocated to vertical control of the rotorcraft, the third level of thrust less than the second level of thrust.

Example 13 includes the non-transitory computer readable storage medium of example 8, wherein the instructions, when executed, cause the machine to determine a first difference between the first thrust state and a reserve state, determine a second difference between the second thrust state and the reserve state, and identify the selected thrust margin based on at least the first difference and the second difference.

Example 14 includes the non-transitory computer readable storage medium of example 8, wherein the instructions, when executed, cause the machine to determine a first control value by multiplying the selected thrust margin and a gain value, determine a second control value based on a sum of the first control value and a third control value, the third control value corresponding to an output from a first transfer function, determine a fourth control value by multiplying the second control value and a second transfer function different from the first transfer function, and determine the first vertical control command based on a minimum value of the fourth control value and the second vertical control command.

Example 15 includes a method to control flight of a rotorcraft, the method comprising determining a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source, determining a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source, identifying the first thrust margin or the second thrust margin as a selected thrust margin based on a vertical control profile of the rotorcraft, determining a first vertical control command based on the selected thrust margin and a second vertical control command, the second vertical control command being executed by the rotorcraft, and controlling the rotorcraft based on the first vertical control command.

Example 16 includes the method of example 15, wherein the rotorcraft is an unmanned aerial vehicle, the first rotors including two or more rotors electrically coupled to the first power source, and the second rotors including two or more rotors electrically coupled to the second power source.

Example 17 includes the method of example 15, wherein at least one of the first power source or the second power source includes one or more batteries, and at least one of the first measurements or the second measurements are based on at least one of a temperature, a current, or a voltage associated with the one or more batteries.

Example 18 includes the method of example 15, wherein the vertical control profile is a first vertical control profile, the first rotors including at least a first rotor and a second rotor, the first measurements including at least a first measurement corresponding to the first rotor and a second measurement corresponding to the second rotor, and further including determining the first thrust state based on the first measurement being greater than at least the second measurement based on the first vertical control profile, the first vertical control profile corresponding to a first level of thrust allocated to vertical control of the rotorcraft, determining the first thrust state based on an average of at least the first measurement and the second measurement based on a second vertical control profile, the second vertical control profile corresponding to a second level of thrust allocated to the vertical control of the rotorcraft, the second level of thrust less than the first level of thrust, and determining the first thrust state based on the first measurement being less than at least the second measurement based on a third vertical control profile, the third vertical control profile corresponding to a third level of thrust allocated to the vertical control of the rotorcraft, the third level of thrust less than the second level of thrust.

Example 19 includes the method of example 15, wherein the vertical control profile is a first vertical control profile, and identifying the selected thrust margin includes selecting the first thrust margin based on the first thrust margin being greater than at least the second thrust margin when the vertical control profile corresponds to a first level of thrust allocated to vertical control of the rotorcraft, selecting the first thrust margin based on an average of at least the first thrust margin and the second thrust margin when the vertical control profile corresponds to a second level of thrust allocated to the vertical control of the rotorcraft, the second level of thrust less than the first level of thrust, and selecting the first thrust margin based on the first thrust margin being less than at least the second thrust margin when the vertical control profile corresponds to a third level of thrust allocated to vertical control of the rotorcraft, the third level of thrust less than the second level of thrust.

Example 20 includes the method of example 15, further including determining a first difference between the first thrust state and a reserve state, determining a second difference between the second thrust state and the reserve state, and identifying the selected thrust margin based on at least the first difference and the second difference.

Example 21 includes the method of example 15, further including determining a first control value by multiplying the selected thrust margin and a gain value, determining a second control value based on a sum of the first control value and a third control value, the third control value corresponding to an output from a first transfer function, determining a fourth control value by multiplying the second control value and a second transfer function different from the first transfer function, and determining the first vertical control command based on a minimum value of the fourth control value and the second vertical control command.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to control flight of a rotorcraft, the apparatus comprising:
   a thrust state determiner to:
   determine a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source;

determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;

determine a first difference between the first thrust state and a reserve state;

determine a second difference between the second thrust state and the reserve state; and identify the first thrust margin or the second thrust margin as a selected thrust margin based on at least one of the first difference, the second difference, or a vertical control profile of the rotorcraft; and a command generator to:

determine a first vertical control command based on the selected thrust margin and a second vertical control command, the second vertical control command being executed by the rotorcraft; and control the rotorcraft based on the first vertical control command.

2. The apparatus of claim 1, wherein the rotorcraft is an unmanned aerial vehicle, the first rotors including two or more rotors electrically coupled to the first power source, the second rotors including two or more rotors electrically coupled to the second power source, and further including a sensor interface to:

obtain the first measurements associated with the two or more rotors electrically coupled to the first power source; and obtain the second measurements associated with the two or more rotors electrically coupled to the second power source.

3. The apparatus of claim 1, wherein at least one of the first power source or the second power source includes one or more batteries, at least one of the first measurements or the second measurements are based on at least one of a temperature, a current, or a voltage associated with the one or more batteries, and further including a sensor interface to obtain the at least one of the temperature, the current, or the voltage.

4. The apparatus of claim 1, wherein the vertical control profile is a first vertical control profile, the first rotors including at least a first rotor and a second rotor, the first measurements including at least a first measurement corresponding to the first rotor and a second measurement corresponding to the second rotor, and the thrust state determiner is to:

determine the first thrust state based on the first measurement being greater than at least the second measurement based on the first vertical control profile, the first vertical control profile corresponding to a first level of thrust allocated to vertical control of the rotorcraft;

determine the first thrust state based on an average of at least the first measurement and the second measurement based on a second vertical control profile, the second vertical control profile corresponding to a second level of thrust allocated to the vertical control of the rotorcraft, the second level of thrust less than the first level of thrust; and determine the first thrust state based on the first measurement being less than at least the second measurement based on a third vertical control profile, the third vertical control profile corresponding to a third level of thrust allocated to the vertical control of the rotorcraft, the third level of thrust less than the second level of thrust.

5. An apparatus to control flight of a rotorcraft, the apparatus comprising:

a thrust state determiner to:

determine a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source;

determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;

identify the first thrust margin or the second thrust margin as a selected thrust margin based on at least one of:

a first determination that a vertical control profile of the rotorcraft corresponds to a first level of thrust allocated to vertical control of the rotorcraft, the first determination based on the first thrust margin being greater than at least the second thrust margin;

a second determination that the vertical control profile corresponds to a second level of thrust allocated to the vertical control of the rotorcraft, the second determination based on an average of at least the first thrust margin and the second thrust margin, the second level of thrust less than the first level of thrust; or a third determination that the vertical control profile corresponds to a third level of thrust allocated to the vertical control of the rotorcraft, the third determination based on the first thrust margin being less than at least the second thrust margin, the third level of thrust less than the second level of thrust; and a command generator to:

determine a first vertical control command based on the selected thrust margin and a second vertical control command, the second vertical control command being executed by the rotorcraft; and control the rotorcraft based on the first vertical control command.

6. The apparatus of claim 5, wherein at least one of the first power source or the second power source includes one or more batteries, at least one of the first measurements or the second measurements are based on at least one of a temperature, a current, or a voltage associated with the one or more batteries, and further including a sensor interface to obtain the at least one of the temperature, the current, or the voltage.

7. An apparatus to control flight of a rotorcraft, the apparatus comprising:

a thrust state determiner to:

determine a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source;

determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source; and identify the first thrust margin or the second thrust margin as a selected thrust margin based on a vertical control profile of the rotorcraft; and a command generator to:

determine a first control value based on a first multiplication of the selected thrust margin and a gain value;

determine a second control value based on a sum of the first control value and a third control value, the third control value corresponding to an output from a first transfer function;

determine a fourth control value based on a second multiplication of the second control value and a second transfer function, the second transfer function different from the first transfer function;

determine a first vertical control command based on a minimum value of the fourth control value and a second vertical control command being executed by the rotorcraft; and control the rotorcraft based on the first vertical control command.

8. A non-transitory computer readable storage medium comprising instructions that, when executed, cause a machine to at least:

determine a first thrust margin between a first limit of first available power for first rotors of a rotorcraft and a first thrust state associated with the first rotors, the first available power based on a first power source of the rotorcraft, the first thrust state based on first measurements associated with the first rotors powered by the first power source;

determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;

determine a first difference between the first thrust state and a reserve state;

determine a second difference between the second thrust state and the reserve state;

identify the first thrust margin or the second thrust margin as a selected thrust margin based on at least one of the first difference, the second difference, or a vertical control profile of the rotorcraft;

determine a first vertical control command based on the selected thrust margin and a second vertical control command, the second vertical control command being executed by the rotorcraft; and control the rotorcraft based on the first vertical control command.

9. The non-transitory computer readable storage medium of claim 8, wherein the rotorcraft is an unmanned aerial vehicle, the first rotors including two or more rotors electrically coupled to the first power source, the second rotors including two or more rotors electrically coupled to the second power source, and the instructions, when executed, cause the machine to:

obtain the first measurements associated with the two or more rotors electrically coupled to the first power source; and obtain the second measurements associated with the two or more rotors electrically coupled to the second power source.

10. The non-transitory computer readable storage medium of claim 8, wherein at least one of the first power source or the second power source includes one or more batteries, at least one of the first measurements or the second measurements are based on at least one of a temperature, a current, or a voltage associated with the one or more batteries, and the instructions, when executed, cause the machine to obtain the at least one of the temperature, the current, or the voltage.

11. The non-transitory computer readable storage medium of claim 8, wherein the vertical control profile is a first vertical control profile, the first rotors including at least a first rotor and a second rotor, the first measurements including at least a first measurement corresponding to the first rotor and a second measurement corresponding to the second rotor, and the instructions, when executed, cause the machine to:

determine the first thrust state based on the first measurement being greater than at least the second measurement based on the first vertical control profile, the first vertical control profile corresponding to a first level of thrust allocated to vertical control of the rotorcraft;

determine the first thrust state based on an average of at least the first measurement and the second measurement based on a second vertical control profile, the second vertical control profile corresponding to a second level of thrust allocated to the vertical control of the rotorcraft, the second level of thrust less than the first level of thrust; and determine the first thrust state based on the first measurement being less than at least the second measurement based on a third vertical control profile, the third vertical control profile corresponding to a third level of thrust allocated to the vertical control of the rotorcraft, the third level of thrust less than the second level of thrust.

12. A non-transitory computer readable storage medium comprising instructions that, when executed, cause a machine to at least:

determine a first thrust margin between a first limit of first available power for first rotors of a rotorcraft and a first thrust state associated with the first rotors, the first available power based on a first power source of the rotorcraft, the first thrust state based on first measurements associated with the first rotors powered by the first power source;

determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;

identify the first thrust margin or the second thrust margin as a selected thrust margin based on at least one of:

a first determination that a vertical control profile of the rotorcraft corresponds to a first level of thrust allocated to vertical control of the rotorcraft, the first
determination based on the first thrust margin being
greater than at least the second thrust margin;
a second determination that the vertical control profile
corresponds to a second level of thrust allocated to
the vertical control of the rotorcraft, the second
determination based on an average of at least the first
thrust margin and the second thrust margin, the
second level of thrust less than the first level of
thrust; or
a third determination that the vertical control profile
corresponds to a third level of thrust allocated to the
vertical control of the rotorcraft, the third determination based on the first thrust margin being less than
at least the second thrust margin, the third level of
thrust less than the second level of thrust;
determine a first vertical control command based on the
selected thrust margin and a second vertical control
command, the second vertical control command to be
executed by the rotorcraft; and
control the rotorcraft based on the first vertical control
command.

13. A non-transitory computer readable storage medium comprising instructions that, when executed, cause a machine to at least:
determine a first thrust margin between a first limit of first available power for first rotors of a rotorcraft and a first thrust state associated with the first rotors, the first available power based on a first power source of the rotorcraft, the first thrust state based on first measurements associated with the first rotors powered by the first power source;
determine a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;
identify the first thrust margin or the second thrust margin as a selected thrust margin based on a vertical control profile of the rotorcraft;
determine a first control value based on a first multiplication of the selected thrust margin and a gain value;
determine a second control value based on a sum of the first control value and a third control value, the third control value corresponding to an output from a first transfer function;
determine a fourth control value based on a second multiplication of the second control value and a second transfer function, the second transfer function different from the first transfer function;
determine a first vertical control command based on a minimum value of the fourth control value and a second vertical control command to be executed by the rotorcraft; and
control the rotorcraft based on the first vertical control command.

14. The non-transitory computer readable storage medium of claim 13, wherein the rotorcraft is an unmanned aerial vehicle, the first rotors including two or more rotors electrically coupled to the first power source, the second rotors including two or more rotors electrically coupled to the second power source, and the instructions, when executed, cause the machine to:
obtain the first measurements associated with the two or more rotors electrically coupled to the first power source; and
obtain the second measurements associated with the two or more rotors electrically coupled to the second power source.

15. A method to control flight of a rotorcraft, the method comprising:
determining a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source;
determining a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;
determining a first difference between the first thrust state and a reserve state;
determining a second difference between the second thrust state and the reserve state;
identifying the first thrust margin or the second thrust margin as a selected thrust margin based on at least one of the first difference, the second difference, or a vertical control profile of the rotorcraft;
determining a first vertical control command based on the selected thrust margin and a second vertical control command, the second vertical control command being executed by the rotorcraft; and
controlling the rotorcraft based on the first vertical control command.

16. The method of claim 15, wherein the rotorcraft is an unmanned aerial vehicle, the first rotors including two or more rotors electrically coupled to the first power source, and the second rotors including two or more rotors electrically coupled to the second power source.

17. The method of claim 15, wherein at least one of the first power source or the second power source includes one or more batteries, and at least one of the first measurements or the second measurements are based on at least one of a temperature, a current, or a voltage associated with the one or more batteries.

18. The method of claim 15, wherein the vertical control profile is a first vertical control profile, the first rotors including at least a first rotor and a second rotor, the first measurements including at least a first measurement corresponding to the first rotor and a second measurement corresponding to the second rotor, and further including:
determining the first thrust state based on the first measurement being greater than at least the second measurement based on the first vertical control profile, the first vertical control profile corresponding to a first level of thrust allocated to vertical control of the rotorcraft;
determining the first thrust state based on an average of at least the first measurement and the second measurement based on a second vertical control profile, the second vertical control profile corresponding to a second level of thrust allocated to the vertical control of the rotorcraft, the second level of thrust less than the first level of thrust; and determining the first thrust state based on the first measurement being less than at least the second measurement based on a third vertical control profile, the third vertical control profile corresponding to a third level of thrust allocated to the vertical control of the rotorcraft, the third level of thrust less than the second level of thrust.

19. A method to control flight of a rotorcraft, the method comprising:

determining a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source;

determining a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;

identifying the first thrust margin or the second thrust margin as a selected thrust margin based on at least one of:

a first determination that a vertical control profile of the rotorcraft corresponds to a first level of thrust allocated to vertical control of the rotorcraft, the first determination based on the first thrust margin being greater than at least the second thrust margin;

a second determination that the vertical control profile corresponds to a second level of thrust allocated to the vertical control of the rotorcraft, the second determination based on an average of at least the first thrust margin and the second thrust margin, the second level of thrust less than the first level of thrust; or a third determination that the vertical control profile corresponds to a third level of thrust allocated to the vertical control of the rotorcraft, the third determination based on the first thrust margin being less than at least the second thrust margin, the third level of thrust less than the second level of thrust;

determining a first vertical control command based on the selected thrust margin and a second vertical control command, the second vertical control command being executed by the rotorcraft; and controlling the rotorcraft based on the first vertical control command.

20. The method of claim 19, wherein the rotorcraft is an unmanned aerial vehicle, the first rotors including two or more rotors electrically coupled to the first power source, and the second rotors including two or more rotors electrically coupled to the second power source.

21. A method to control flight of a rotorcraft, the method comprising:

determining a first thrust margin between a first limit of first available power for first rotors of the rotorcraft and a first thrust state associated with the first rotors, the first available power based on a first power source of the rotorcraft, the first thrust state based on first measurements associated with the first rotors powered by the first power source;

determining a second thrust margin between a second limit of second available power for second rotors of the rotorcraft and a second thrust state associated with the second rotors, the second available power based on a second power source of the rotorcraft, the second thrust state based on second measurements associated with the second rotors powered by the second power source;

identifying the first thrust margin or the second thrust margin as a selected thrust margin based on a vertical control profile of the rotorcraft;

determining a first control value by multiplying the selected thrust margin and a gain value;

determining a second control value based on a sum of the first control value and a third control value, the third control value corresponding to an output from a first transfer function;

determining a fourth control value by multiplying the second control value and a second transfer function different from the first transfer function;

determining a first vertical control command based on a minimum value of the fourth control value and a second vertical control command being executed by the rotorcraft; and controlling the rotorcraft based on the first vertical control command.

* * * * *